United States Patent
Qiu et al.

(10) Patent No.: US 11,481,627 B2
(45) Date of Patent: Oct. 25, 2022

(54) DISTRIBUTED LEARNING OF COMPOSITE MACHINE LEARNING MODELS

(71) Applicant: Microsoft Technology Licensing, LLC, Redmond, WA (US)

(72) Inventors: Yuwei Qiu, Pittsburgh, PA (US); Chengming Jiang, Sunnyvale, CA (US); Huiji Gao, Sunnyvale, CA (US); Bee-Chung Chen, Mountain View, CA (US); Bo Long, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 546 days.

(21) Appl. No.: 16/669,283

(22) Filed: Oct. 30, 2019

(65) Prior Publication Data

US 2021/0133555 A1    May 6, 2021

(51) Int. Cl.
  *G06E 1/00* (2006.01)
  *G06E 3/00* (2006.01)
  *G06G 7/00* (2006.01)
  *G06N 3/08* (2006.01)
  *G06N 3/04* (2006.01)

(52) U.S. Cl.
  CPC ............. *G06N 3/08* (2013.01); *G06N 3/0454* (2013.01)

(58) Field of Classification Search
  CPC ................................ G06N 3/08; G06N 3/0454
  USPC ......................................... 705/16, 21, 18, 26
  See application file for complete search history.

(56) References Cited

U.S. PATENT DOCUMENTS

| | | | | |
|---|---|---|---|---|
| 11,256,698 B2* | 2/2022 | Idicula | ................. | G06N 3/0454 |
| 11,281,969 B1* | 3/2022 | Rangapuram | .......... | G06V 10/82 |
| 2014/0052679 A1* | 2/2014 | Sinyavskiy | ............... | G06N 3/10 |
| | | | | 706/44 |
| 2018/0260713 A1* | 9/2018 | Liang | .................... | G06N 3/0454 |
| 2018/0293492 A1* | 10/2018 | Kalamkar | ............ | G06N 3/0454 |
| 2018/0293493 A1* | 10/2018 | Kalamkar | ............ | G06N 3/0445 |
| 2018/0322606 A1* | 11/2018 | Das | ........................ | G06T 1/20 |
| 2020/0125568 A1* | 4/2020 | Idicula | .................... | G06N 20/20 |
| 2021/0097383 A1* | 4/2021 | Kaur | ........................ | G06N 3/08 |

* cited by examiner

*Primary Examiner* — Marceau Milord
(74) *Attorney, Agent, or Firm* — Nicholson De Vos Webster & Elliott LLP

(57) ABSTRACT

Computer-implemented techniques for learning composite machine learned models are disclosed. Benefits to implementors of the disclosed techniques include allowing non-machine learning experts to use the techniques for learning a composite machine learned model based on a learning dataset, reducing or eliminating the explorative trial and error process of manually tuning architectural parameters and hyperparameters, and reducing the computing resource requirements and model learning time for learning composite machine learned models. The techniques improve the operation of distributed learning computing systems by reducing or eliminating straggler effects and by reducing or minimizing synchronization latency when executing a composite model search algorithm for learning a composite machine learned model.

20 Claims, 17 Drawing Sheets

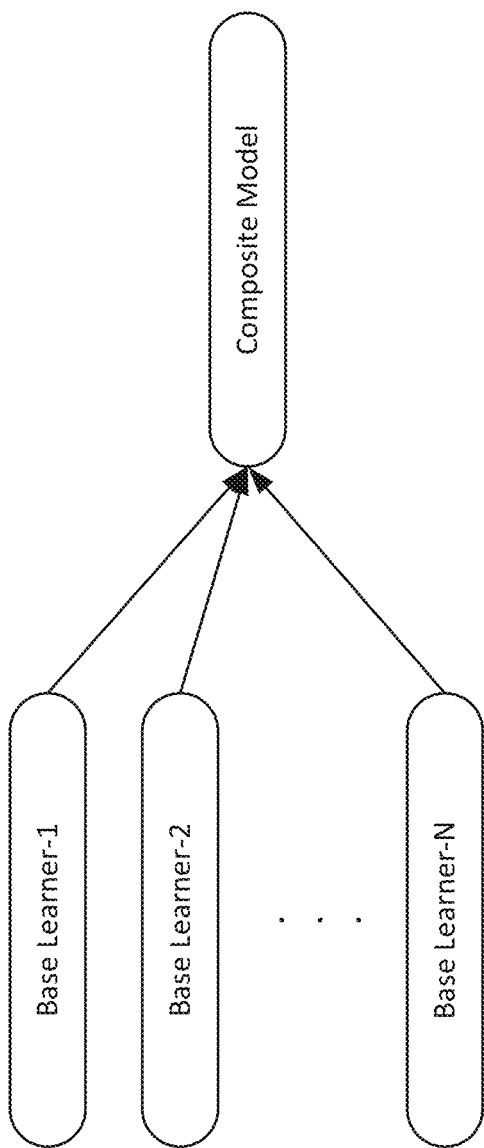

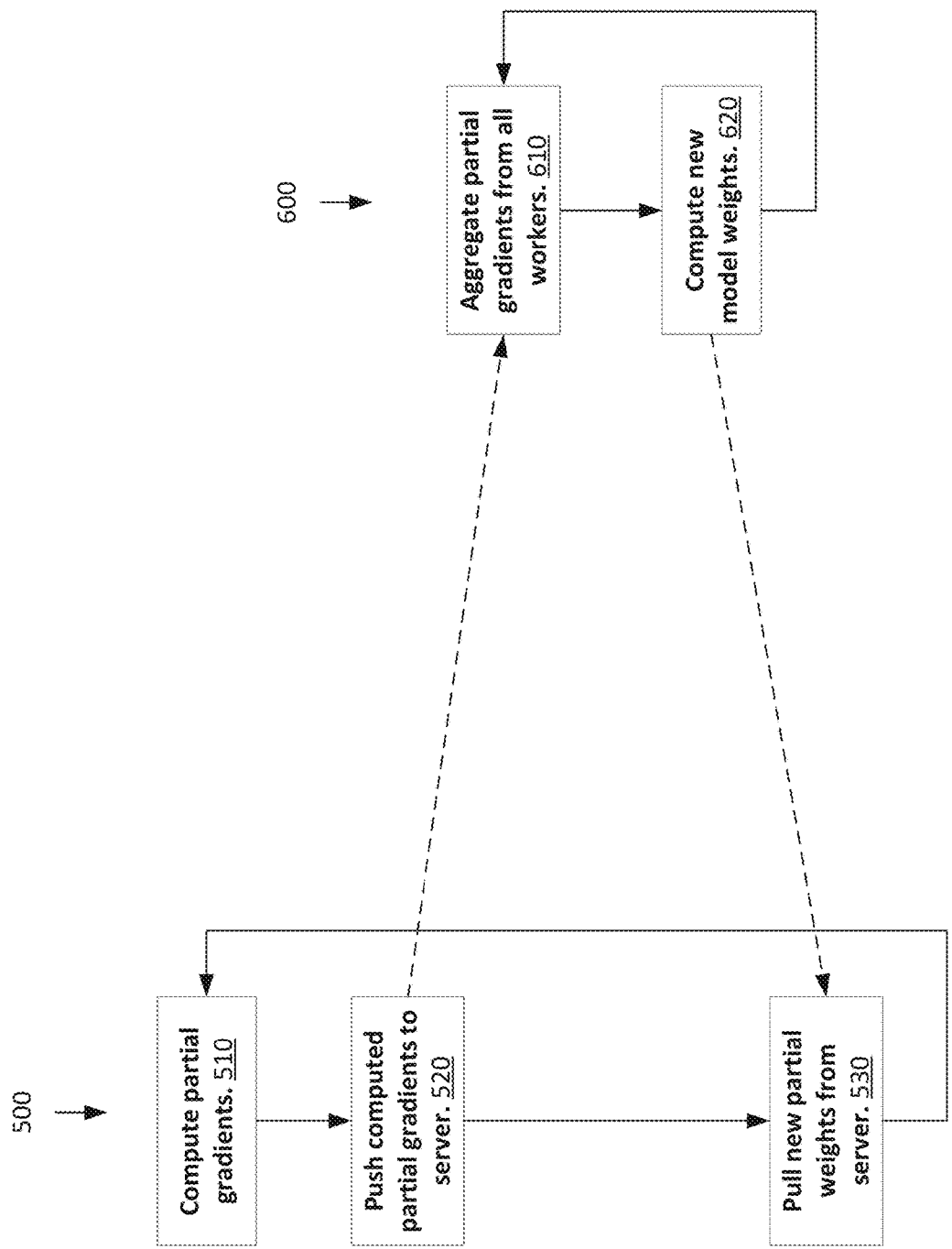

DISTRIBUTED LEARNING OF COMPOSITE MACHINE LEARNING MODELS

TECHNICAL FIELD

The present disclosure relates to machine learning. More particularly, the present disclosure relates to computer-implemented techniques for distributed learning of composite machine learning models.

BACKGROUND

In recent years, machine learning techniques have achieved remarkably improved performance in several areas. With such improvements, machine learning techniques are now being used to provide business and enterprise solutions. For example, within an online professional network, machine learning techniques may be used to recommend jobs a user might be interested in, to suggest other professionals in the network to connect with, for natural language processing tasks, or for other tasks. Given the early successes applying machine learning techniques in the business and enterprise domains, their use in those domains can only be expected to increase in the future.

Unfortunately, applying machine learning techniques can be human intensive, requiring great technical expertise. Not all businesses and organizations have the resources to hire experienced and qualified machine learning engineers. Even if experts are available, the performance of a machine learning technique at a given task can be quite sensitive to the tuning of many architectural parameters and hyperparameters. Exploration of different machine learning techniques can require significant computing resources. This requirement is a significant challenge today in the era of "big data" with gigabyte, terabyte and even petabyte-scale learning datasets.

Disclosed embodiments address these and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well-understood, routine, or conventional, merely by virtue of their inclusion in this section.

BRIEF DESCRIPTION OF THE DRAWINGS

In the drawings:

FIG. 1 shows a composite machine learning model, according to some disclosed embodiments.

FIG. 5 is a flowchart of a process performed by a worker in a distributed learning computing system, according to some disclosed embodiments.

FIG. 6 is a flowchart of a process performed by a parameter sever in a distributed learning computing system, according to some disclosed embodiments.

DETAILED DESCRIPTION

Figure 3:
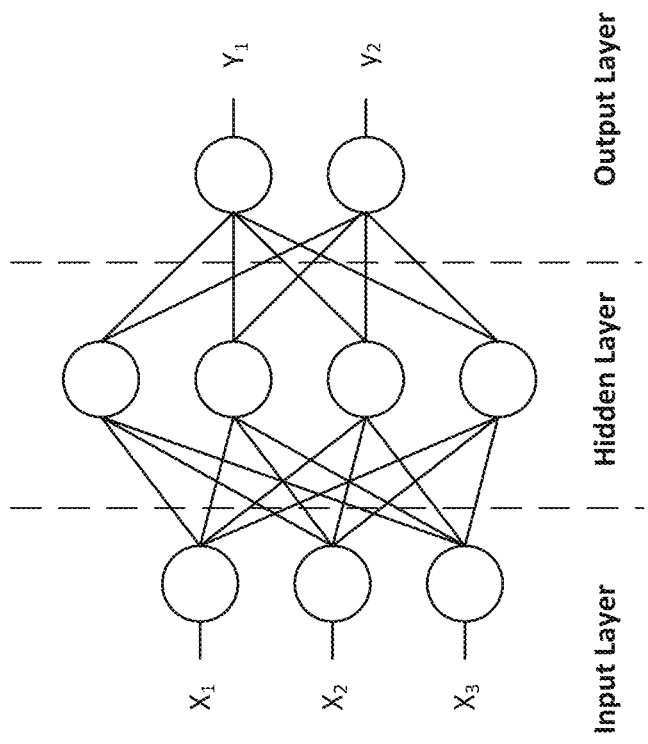
FIG. 3 depicts a multi-layer feedforward artificial neural network, according to some disclosed embodiments.

In the following description, for the purposes of explanation, numerous specific details are set forth in order to provide a thorough understanding of embodiments of the present invention. It will be apparent, however, that embodiments of the present invention may be practiced without these specific details. In other instances, some structures and devices are shown in block diagram form in order to avoid unnecessarily obscuring embodiments of the present invention.

General Overview

Computer-implemented techniques for learning composite machine learned models are disclosed. Benefits to implementors of the disclosed techniques include allowing non-machine learning experts to use the techniques for learning a composite machine learned model based on a learning dataset, reducing or eliminating the explorative trial and error process of manually tuning architectural parameters and hyperparameters, and reducing the computing resource requirements and model learning time for learning composite machine learned models. The techniques improve the operation of distributed learning computing systems by reducing or eliminating straggler effects and by reducing or minimizing synchronization latency when executing a composite model search algorithm for learning a composite machine learned model.

Composite Machine Learned Models

The disclosed techniques may be used to learn a composite machine learned model as a composite of sub-machine learned models with the ability to scale to learning datasets containing potentially thousands to billions of learning examples. Before discussing the techniques in greater detail, some terminology will be discussed. The following definitions are offered for purposes of illustration, not limitation, in order to assist with understanding the discussion that follows.

As used herein, the term "learning dataset" may encompass a set of feature vectors where each feature vector may encompass a description of an object by using a set of features. The number of features of a learning dataset is sometimes referred to as the dimension or dimensionality of the learning dataset. A feature vector is sometimes referred to as an "example," in the context of learning a model, and a "sample," in the context of generating an inference or prediction using a learned model.

As used herein, the term "machine learned model," or just "model," may encompass an inference or predictive model constructed or discovered from a learning dataset by a machine learning algorithm, such as, for example, a regression algorithm (e.g., linear regression, logistic regression, etc.), an artificial neural network algorithm (e.g., perceptron, multilayer perceptron, back-propagation, stochastic gradient descent, etc.), or a deep learning algorithm (e.g., a convolutional neural network).

The process of generating a machine learned model from a learning dataset is sometimes referred to as "learning." Learning a machine learned model can occur in different learning settings, including in a supervised learning setting, an unsupervised learning setting, or in a semi-supervised setting. In supervised learning, a goal may be to infer the value of a target feature on unseen samples where a machine learned model is learned using labeled examples. In contrast, unsupervised learning may not rely on labeled examples when learning a machine learned model. Instead, a goal of unsupervised learning may be to discover some inherent distributional information in the learning dataset such as, for example, the cluster structure of a set of data points. With semi-supervised learning, there is a mixture of labeled and unlabeled examples in the learning dataset.

As used herein, the term "composite machine learned model, or just "composite model," may encompass a machine learned model that is constructed from a combination of a set of sub-machine learned models ("sub-models"). FIG. 1 shows a possible composite model architecture, according to some disclosed embodiments. The composite model contains a number of sub-models (e.g., Base Learner-1, Base Learner-2, . . . , Base Learner-N) which are sometimes called "base" learners. A base learner may be generated from a learning dataset according to a base machine learning algorithm which can be, for example, a regression algorithm (e.g., linear regression, logistic regression, etc.), an artificial neural network algorithm (e.g., perceptron, multilayer perceptron, back-propagation, stochastic gradient descent, etc.), or a deep learning algorithm (e.g., a convolutional neural network). Different base learners may be generated according to different base machine learning algorithms.

As used herein, the term "artificial neural network," or just "neural network," may encompass computerized simulations of biological neural networks. The function of a neural network may be determined by the model of an artificial neuron, the structure of the neural network, and the machine learning algorithm. An artificial neuron in a neural network is sometimes called a "unit." A unit may be the basic computation component in neural networks. A unit may be based on, for example, the McCulloch-Pitts (M-P) model.

Figure 2:
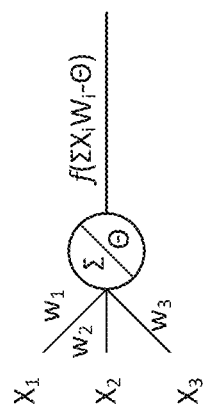
FIG. 2 illustrates a model of an artificial neuron, according to some disclosed embodiments.

According to the M-P model, as depicted in FIG. 2, input signals (e.g., $X_1$, $X_2$, and $X_3$) may be multiplied with corresponding connection weights (e.g., $W_1$, $W_2$, and $W_3$), and then signals may be aggregated and compared with a threshold or bias of the unit. If the aggregated signal is larger than the bias, then the unit may be activated and generate an output signal according to an activation function (e.g., $J(\Sigma X_i W_i - \Theta)$). The unit maybe linked by weighted connections to form a network of units. Many different types of neural networks exist including multi-layer feedforward neural networks.

A possible multi-layer feedforward neural network is shown in FIG. 3. In the neural network of FIG. 3, units are connected layer-by-layer, and there may not be either intra-layer connections or cross-layer connections. The neural network may include an input layer which may receive input feature vectors, where each unit of the input layer may correspond to one element of a feature vector. The activation function for an input unit may be the identity function $f(x)=x$. However, other activation functions for an input layer unit are possible. The output layer may output labels, where each unit in the output layer may correspond to a possible label, or an element of a label vector. The layers between the input layer and the output layer are sometimes referred to as hidden layers. The neural network may have more than one hidden layer and such a neural network is sometimes referred to as a deep neural network. The units of the hidden and output layers may be functional units that use a sigmoid function as the activation function. Other activation functions for a hidden layer or an output layer unit are possible.

A goal of learning a neural network may be to determine the values of the connection weights and the biases of the units. Once these values are determined, the function computed by the neural network may be decided. The neural network may use differentiable activation functions, and the entire neural network may be optimized using a gradient descent method such as, for example, back-propagation. With back-propagation, the inputs may be feed-forwarded from the input layer via the hidden layer(s) to the output layer, at which the error is calculated by comparing the network output with a ground-truth. Then, the error may be back propagated to the hidden layer(s) and the input layer, during which the connection weights and biases are adjusted to reduce the error. The process may be accomplished by tuning towards the direction with the gradient. The process may be repeated for many rounds, until the training error is minimized of the training process is terminated to avoid overfitting.

While in some disclosed embodiments the techniques for learning composite machine learning models are applied in the supervised learning context to learn a composite deep artificial neural network composed of multiple sub-neural networks, the techniques are not so limited and may be applied in an unsupervised learning context, a supervised learning context, or a semi-supervised learning context with other types of machine learning models including a combination of different machine learning models. For example, the sub-models can be as simple as an if-statement, or as complex as convolutional or recurrent artificial neural networks.

Functional Overview

With the disclosed techniques, learning composite models from large learning datasets is more automated, more efficient (with less trial-and-error performed by humans), and requires less expertise in architectural parameter and hyperparameter tuning required, compared to more manual approaches. The disclosed techniques encompass composite model architecture search and hyperparameter tuning with reduced expert intervention in a distributed learning computing system.

An example distributed learning computing system is described in greater detail elsewhere in this disclosure. Briefly, however, the distributed learning computing system may encompass one or more groups of "workers." Each worker may execute on a computing device and the workers in a group may execute on a cluster of one or more computing devices. The one or more computing devices may encompass one or more hardware processing units. A hardware processing unit can be a central processing unit (CPU), a graphics processing unit (GPU), a tensor processing unit (TPU), or an artificial intelligence accelerator microprocessor. Workers can execute concurrently on a hardware processing unit. Workers can execute in parallel across multiple hardware processing units.

The disclosed techniques may encompass performance of a composite model search algorithm. The search algorithm can create a composite model by selecting optimal sub-models using an adaptive learning process to create the composite model. The search algorithm can add structurally diverse sub-models of different depths, widths, and types including, but not limited to, fully connected neural networks, convolutional neural networks, residual blocks, recurrent neural networks, and user-designed structures, and at the same time balance the performance of the composite model against structural complexity of the composite model. With the disclosed techniques, learning the composite model may be as simple, in terms of hyperparameters, from an end-user's perspective as training a linear machine learning model.

The search algorithm may operate by iteratively learning multiple, lightweight sub-models that are synchronized to create a composite model. However, the search algorithm can confront performance challenges when executed on a cluster of multiple workers. In particular, the performance of the search algorithm on a cluster may be affected by a straggler effect. The straggler effect may result from the learning time of different sub-models being different with some sub-models taking longer to learn than others. In addition, the overhead of network communications between workers in the cluster when synchronizing the composite model can affect the performance of the search algorithm.

The issues associated with straggler effects and network communication overhead during synchronization when executing the search algorithm in a distributed learning computing system may be reduced or mitigated by employing a network-level asynchronous distributed learning strategy that may scale better with larger clusters in terms of total composite model learning time when compared to other distributed learning strategies. With the network-level asynchronous distributed learning strategy, sub-models may be learned separately with different shares of cluster resources according to the complexity of their respective sub-model architectures. By doing so, the number of workers learning a single sub-model may be reduced, thereby reducing network communications in the cluster. Further, workers training one sub-model need not idly wait for other workers in the cluster to finish learning other sub-models before the workers are scheduled to learn a new sub-model, thereby reducing or mitigation straggler effects.

The network-level asynchronous distributed learning strategy can provide improvements to a distributed learning computing system including, but not limited to, the ability to more efficiently explore for an optimal composite model structure on large learning datasets and the ability to better scale composite model architecture search and hyperparameter tuning on a cluster of hardware processors.

Parameter Server Framework

According to some disclosed embodiments, the network-level asynchronous distributed learning strategy is employed in a parameter server framework. Learning a composite model can require a large learning dataset on the order, for example, of gigabytes, petabytes, or terabytes in size. Such a learned composite model may encompass parameters (e.g., model weights and model bias) that, during learning, are optimized for error during inference. The number of parameters might be on the order of thousands, millions, billions to even trillions. It may not be practical or even possible to learn such a large composite model using a single computing device. Accordingly, a distributed learning computing system composed of multiple computing nodes may be needed.

As used herein, the term "computing node" encompasses a physical computing device and may correspond to an operating system instance or an operating system container instance executing on the physical computing device. Multiple operating system container instances can execute on the physical computing device. Multiple operating system instances can execute on the physical computing device with the aid of a Type-1 or Type-2 hypervisor. Thus, multiple different computing nodes may encompass the same physical computing device. However, a one-to-one correspondence is also possible.

In a distributed learning computing system, parameters may need to be shared among multiple computing nodes where the parameters are updated during execution of the composite model search algorithm on the distributed learning computing system. The communication over a data communications network (e.g., an Internet Protocol (IP)-based data communications network) of the large number of parameters among multiple computing nodes can be a bottleneck for the performance of the search algorithm because of the network bandwidth required to share the parameters and because of the synchronization of parameters between computing nodes that may be needed. In addition, if the computing nodes are implemented using commodity computing devices, then failure of computing nodes should be expected. The parameter server framework addresses these and other issues. The network-level asynchronous distributed learning strategy disclosed herein that is employed in the parameter server framework further addresses these and other issues especially with respect to large-scale learning datasets gigabytes, terabytes, or petabytes in size.

According to some disclosed embodiments, the parameter server framework encompasses an asynchronous task model and application programming interface for reducing overall network bandwidth consumption for learning a composite model. The framework may reduce the cost of synchronization by allowing relaxed consistency. The framework may allow software developers or other technical personnel to choose between algorithm convergence and learning performance. The framework may allow for adding more horizontal computing capacity without restarting model learning. The framework may allow for quick (e.g., within seconds) recovery of computing tasks on a computing node that fails. The framework application programming interface (API) may be structured to support machine learning constructs such as sparse vectors, metrices, and tensors.

For example, a supervised learning problem for learning a composite model may encompass optimizing a cost function given a learning dataset. Model parameters may be adjusted over learning examples to reduce or minimize the error of inference. Adjustment of model parameters may encompass computing partial derivatives or gradients. The gradients "move" the model parameters in the right "direction" to minimize the cost function error.

Figure 4:
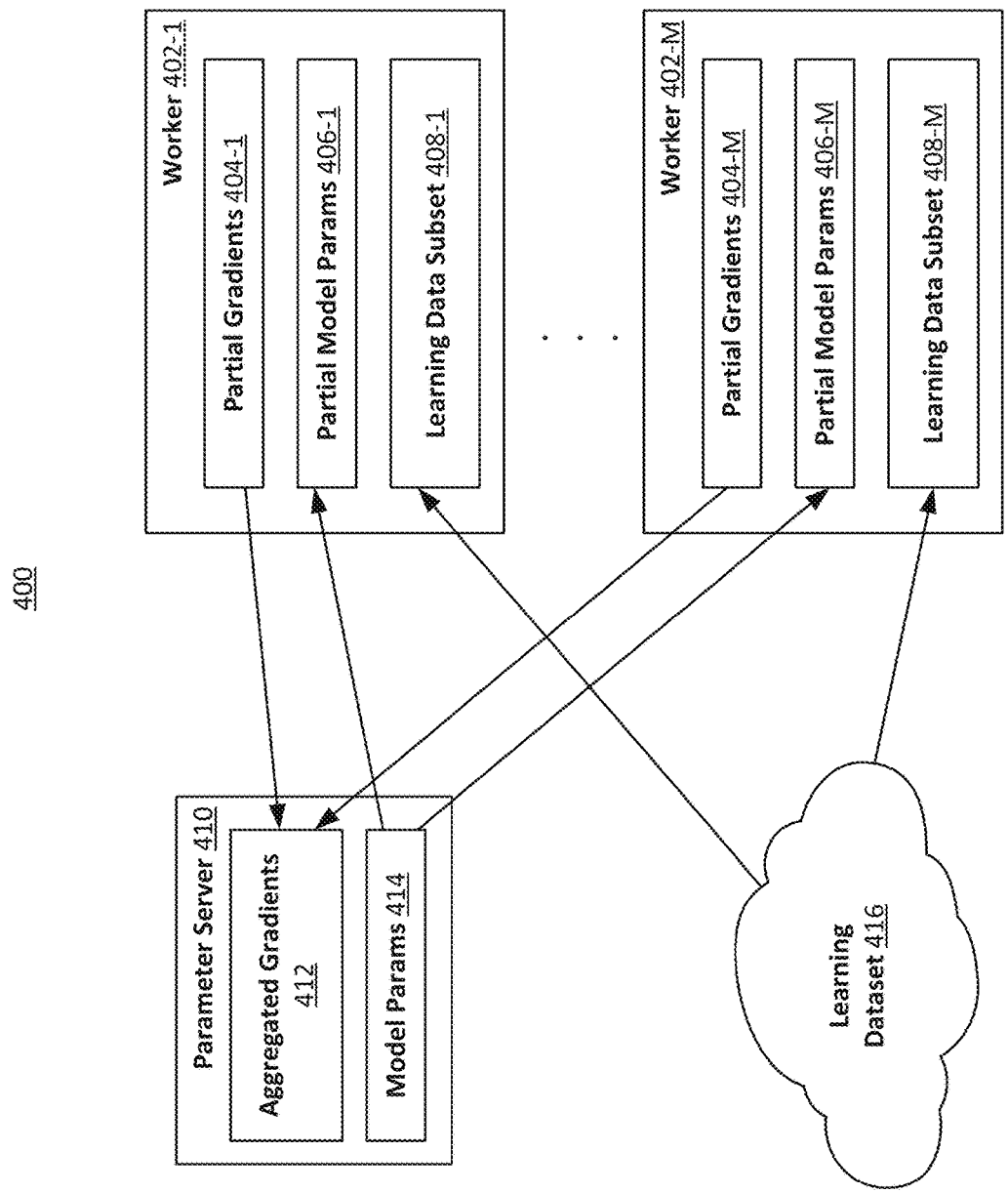
FIG. 4 illustrates a distributed learning computing system, according to some disclosed embodiments.

FIG. 4 illustrates example distributed learning computing system 400 according to the parameter server framework, according to some disclosed embodiments. System 400 has M number of worker computing nodes 402 (also sometimes referred to herein as "workers 402") and parameter server computing node 410 (also sometimes referred to herein as "parameter server 410"). Each worker 402 loads a subset of learning dataset 416 with different workers 402 loading different subsets of learning dataset 416. For example, worker 402-1 loads learning data subset 408-1 and worker 402-M loads learning data subset 408-M. Although only one parameter server is depicted in system 400, there may be multiple parameter servers that are each assigned to a partition of a parameter keyspace that the parameter server is responsible for.

Each worker computes partial gradients on its local learning data subset for cost function optimization based on its partial model parameters. For example, worker 402-1 computes partial gradients 404-1 on learning data subset 408-1 based on partial model parameters 406-1. Worker 402-M computes partial gradients 404-M on learning data subset 408-M based on partial model parameters 406-M.

Each worker then sends the computed partial gradients to a server. For example, worker 402-1 sends computed partial gradients 404-1 to parameter server 410 and worker 402-M pushes computed partial gradients 404-M to parameter server 410. Parameter server 410 then aggregates the computed partial gradients 404 received from workers 402 to produce aggregated gradients 412 at parameter server 410 and updates model parameters 414 at parameter server 410 based on aggregated gradients 412.

Once parameter server 410 computes aggregated gradients 412 and updates model parameters 414 based thereon, workers 402 can pull updated partial model parameters 406 of updated model parameters 414 from server 410 and compute new partial gradients 404 based on their respective updated partial model parameters 406. For example, worker 402-1 can pull updated partial model parameters 406-1 of updated model parameters 414 from server 410 and worker 402-M can pull updated partial model parameters 406-M of updated model parameters 414 from parameter server 410. Worker 402-1 can then compute new partial gradients 404-1 on subset 408-1 based on updated partial model parameters 406-1. Likewise, worker 402-1 can then compute new partial gradients 404-M on learning data subset 408-M based on updated partial model parameters 406-M. This push and pull cycle can repeat for a number of iterations. The number of iterations can be predefined (e.g., user-specified) or based on a convergence factor (e.g., amount of error according to model cost function).

Significant computation may be performed at workers 402 computing partial gradients 404. Because each worker (e.g., 402-1) computes partial gradients (e.g., 404-1) on only a subset (e.g., 408-1) of learning dataset 416, each worker needs only a subset of all model parameters 414, which may number into the thousands, millions, billions, or trillions. In particular, each worker (e.g., 402-1) needs only the partial parameters (e.g., 406-1) pertaining to the learning data subset (e.g., 408-1) on which it computes its partial gradients (e.g., 404-1). In this way, system 400 can scale to learn a composite model based on a large learning dataset. Further scalability can be achieved by employing the network-level asynchronous distributed learning strategy described in greater detail elsewhere in this disclosure.

FIG. 5 is flowchart 500 of a process performed by a worker in a distributed learning system according to the parameter server framework, according to some disclosed embodiments. The worker process may be performed by each worker in the distributed learning system. There may be multiple workers in the distributed learning system. Each worker may perform the worker process iteratively for a number of iterations. At block 510, a worker computes partial gradients based on a local learning data subset for a current iteration. At block 520, the worker pushes the partial gradients computed to a parameter server for the current iteration. At block 530, the worker pulls the updated partial model parameters from the server before the next iteration.

FIG. 6 is flowchart 600 of a process performed by a parameter sever in a distributed learning system according to the parameter server framework, according to some disclosed embodiments. The parameter server process may be performed by each parameter server in the distributed learning system. There may be multiple parameter servers in the distributed learning system. However, typically there are fewer parameter servers than there are workers as the workers are used to parallelize the intensive computation of gradients across multiple hardware processors.

Each parameter server may perform the parameter server process iteratively for a number of iterations. At block 610, a server aggregates the partial gradients from multiple workers for a current iteration. At block 620, the server computes new model parameters based on the aggregated partial gradients. For example, computing new model parameters at block 620 may be based on the current model parameters, a learning rate, the aggregated gradients, and a regularization parameter.

Figure 7:
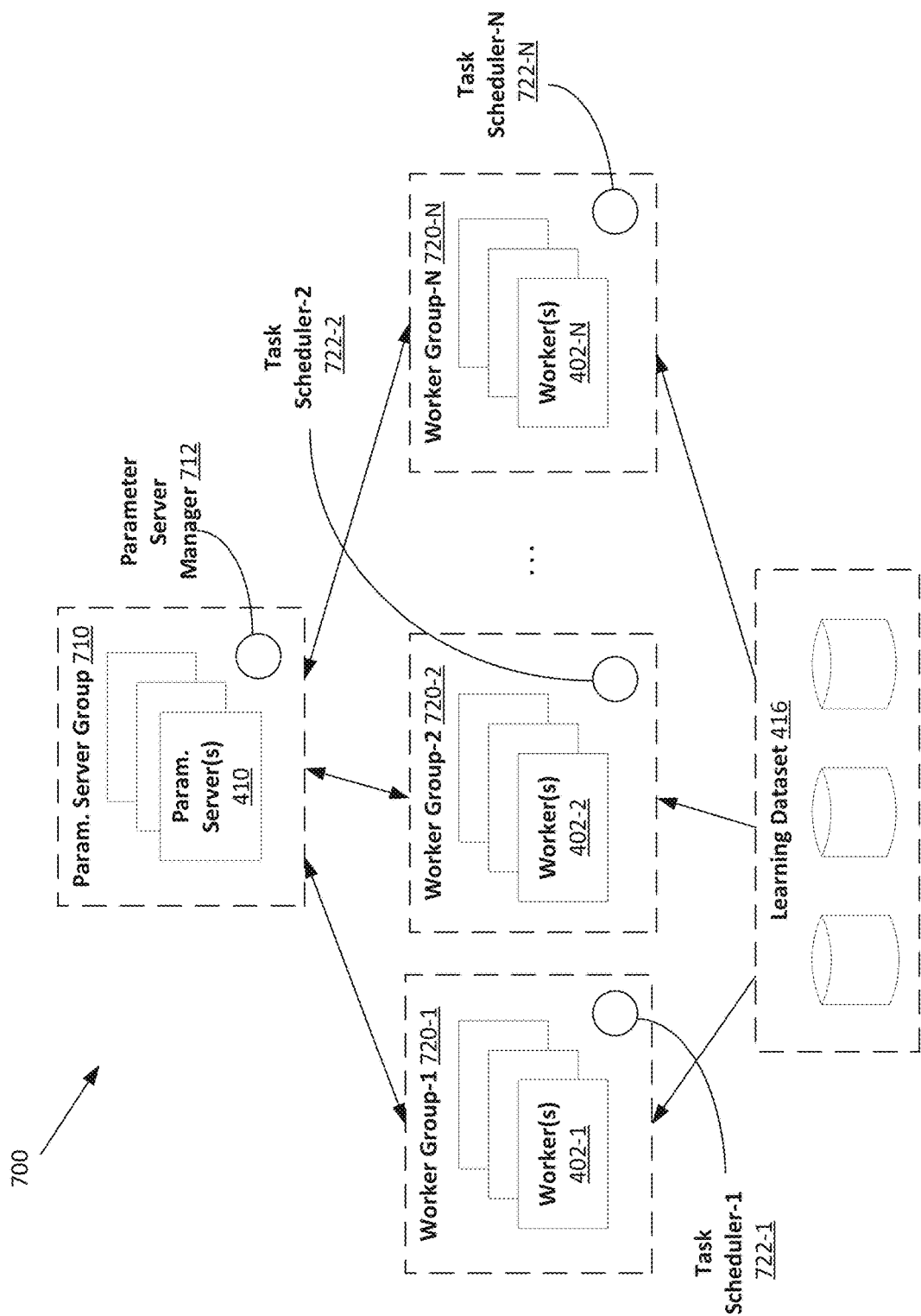
FIG. 7 illustrates a high-level architecture of a distributed learning computing system, according to some disclosed embodiments.

FIG. 7 illustrates the high-level architecture of distributed learning system 700, according to some disclosed embodiments. System 700 includes parameter server group 710 and worker groups 720. Server group 710 has multiple parameter server computing nodes 410. Each worker group 720 has multiple worker computing nodes 402. Each parameter server 410 of parameter server group 710 is assigned a portion of a parameter keyspace. Parameter servers 410 may communicate over a data communications network for migrating or replicating data for scalability and availability. Parameter server manager 712 may maintain a consistent view of parameter server group 710 by performing liveness checks of parameter servers 410 and assigning partitions of the parameter keyspace to servers 410.

Multiple workers 402 make up multiple worker groups 720. Workers 402 communicate over a data communications network with server group 710 for pulling updated model parameters and pushing computed partial gradients as described above. According to some disclosed embodiments, worker groups 720 do not communicate with each other. For example, different worker groups 720 may be assigned to different learning applications.

Each worker group (e.g., 720-2) has a task scheduler (e.g., 722-2). The task scheduler assigns learning tasks to workers (e.g., 402-2) in the worker group (e.g. 720-2). A learning task at a worker may include computing partial gradients from a local learning data subset, executing kernel computation, and aggregating features within a local learning data subset. According to some disclosed embodiments, the same worker can use data stored locally at the worker by iteratively processing the same learning data subset. According to some disclosed embodiments, parameter namespaces can be used for parallelizing learning tasks among multiple worker groups 720. According to some disclosed embodiments, a parameter namespace can be shared among multiple worker groups 720. For example, one worker group (e.g., 720-1) can support real-time inference while another worker group (e.g., 720-2) can support model learning and updating of shared model parameters.

More information on the parameter server framework is described in the paper by Mu Li, David G. Andersen, Jun Woo Park, Alexander J. Smola, Amr Ahmed, Vanja Josifovski, James Long, Eugene J. Shekita, Bor-Yiing Su, Scaling Distributed Machine Learning with the Parameter Server, Proceedings of the 2014 International Conference on Big Data Science and Computing, Aug. 4-7, 2014, Beijing China, the entire contents of which is hereby incorporated by reference.

Composite Neural Network Search Algorithm

According to some disclosed embodiments, a composite neural network is created by selecting sub-neural networks and using an adaptive composite neural network search algorithm to attain the composite neural network. Some theory that underpins the composite neural network search algorithm is described first, followed by a practical workflow clarification.

Theory

The discussion of the theory supporting the composite neural network model search algorithm encompasses the hidden layer family, the neural network family, and the objective function.

Hidden Layer Family

Let l represent the number of intermediate layers in a network and $n_k$ the maximum number of units in layer k. The network can be a composite neural network or a sub-neural network. Each unit j in layer k represents a function denoted by $h_{k,j}$. Let x denote the input, and $\psi(x)$ denote corresponding feature vector. Then, the family of functions defined by the first layer functions $h_{1,j}$ may be represented by the following:

$$H_1 = \{x \mapsto u \cdot \psi(x)\}.$$

The family of functions $h_{k,j}$, in a higher layer k may then be represented as follows:

$$H_k = \{x \mapsto \Sigma_{s=1} u_s \cdot (\psi_s \circ h_s)(x)\},$$

Here, each unit function $h_{k,s}$, $u_s$ represents the vector of weights for connections from that unit to a lower layer s. And $\psi_s \circ h_s$ represents a coordinate-wise composition:

$$\psi_s \circ h_s = (\psi_s \circ h_{s,1}, \psi_s \circ h_{s,2}, \ldots, \psi_s \circ h_{s,ns}),$$

The $\psi_s$ represents a 1-Lipschitz activation function like the Rectified Linear Unit function (ReLu function) or the sigmoid function.

Neural Network Family

The output unit can be connected to all intermediate units, which therefore defines a function $f$, which is the so-called neural networks that are considered as follows:

$$f = \Sigma_{k=1} \Sigma_{j=1} w_{k,j} h_{k,j} = \Sigma_{k=1} w_k \cdot h_k,$$

Here, $h_k = [h_{k,1}, h_{k,2}, \ldots, h_{k,n_k}]$ and $w_k$ represents the vector of connection weights to units of layer k.

Then, F represents the family of functions defined to be the neural networks:

$$F = \{\Sigma_{k=1} W_k \cdot h_k\}.$$

Objective Function

Let $\{h_1, h_2, \ldots, h_N\}$ be a subset of H. The composite neural network search algorithm seeks to find a function $f = \Sigma_{j=1} w_j h_j$, a neural network, that directly minimizes the following objective function:

$$F(w) = \lambda \Sigma_{i=1} \Phi(1 - y_i \Sigma_{j=1} w_j h_j) + \Sigma_{j=1} \beta |w_j|,$$

Here, $\Phi$ represents a loss function such as, for example, the exponential function or softmax function. One of the major advantages to define such a family of neural networks is that the objective function is a convex function of w, which is the sum of a convex surrogate of the empirical error and a regularization term to trade off performance and structure complexity.

According to some disclosed embodiments, the composite neural network search algorithm proceeds in T iterations. At an iteration t, there may be several sub-neural networks in a sub-neural network candidates pool ready to be augmented, and the search algorithm may select one of the following three types of augmentation options:

Augmentation Option 1: Augmenting the current composite neural network with a sub-neural network with the same depth as that of the sub-neural networks of the current candidates pool. Each unit in layer k of this sub-neural network may have connections to the existing units in layer k−1 of the current neural network in addition to units in layer k−1 of the sub-neural network.

Augmentation Option 2: Augmenting the current neural network with a one-layer-deeper sub-neural network compared to that of the sub-neural networks of the current candidates pool. The set of allowed connections is defined the same way as for the first option.

Augmentation Option 3: Augmenting the current neural network with a sub-neural network with more units in one layer compared to that of the sub-neural networks of current candidates pool. The set of allowed connections is defined the same way as for the first option.

The augmentation option that is selected may be the option resulting in a greatest reduction of a current value of a user-designed metric function, which could be the loss objective, accuracy, or area under the curve.

The composite neural network structure after t−1 rounds may be represented by $f_{t-1}$. And the current sub-neural networks in the candidates pool is denoted by:

$$\{h_{t-1,1}, h_{t-1,2}, \ldots h_{t-1,m}\},$$

In the above and the following, the variable m represents the number of sub-neural networks in the candidates pool. And newly generated sub-neural networks in new candidates pool for iteration t is represented by:

$$\{h_{t-1,1}, h_{t-1,1}', h_{t-1,2}, h_{t-1,2}' \ldots, h_{t-1,m} h_{t-1,m}'\}.$$

Therefore, it is equivalent to minimize the following objective function at iteration t $$F(w,u) = \lambda \Sigma_{i=1} \Phi(1 - y_i f_{t-1}(x_i) - y_i w \cdot u(x_i)) + \beta |w|.$$

Figure 8:
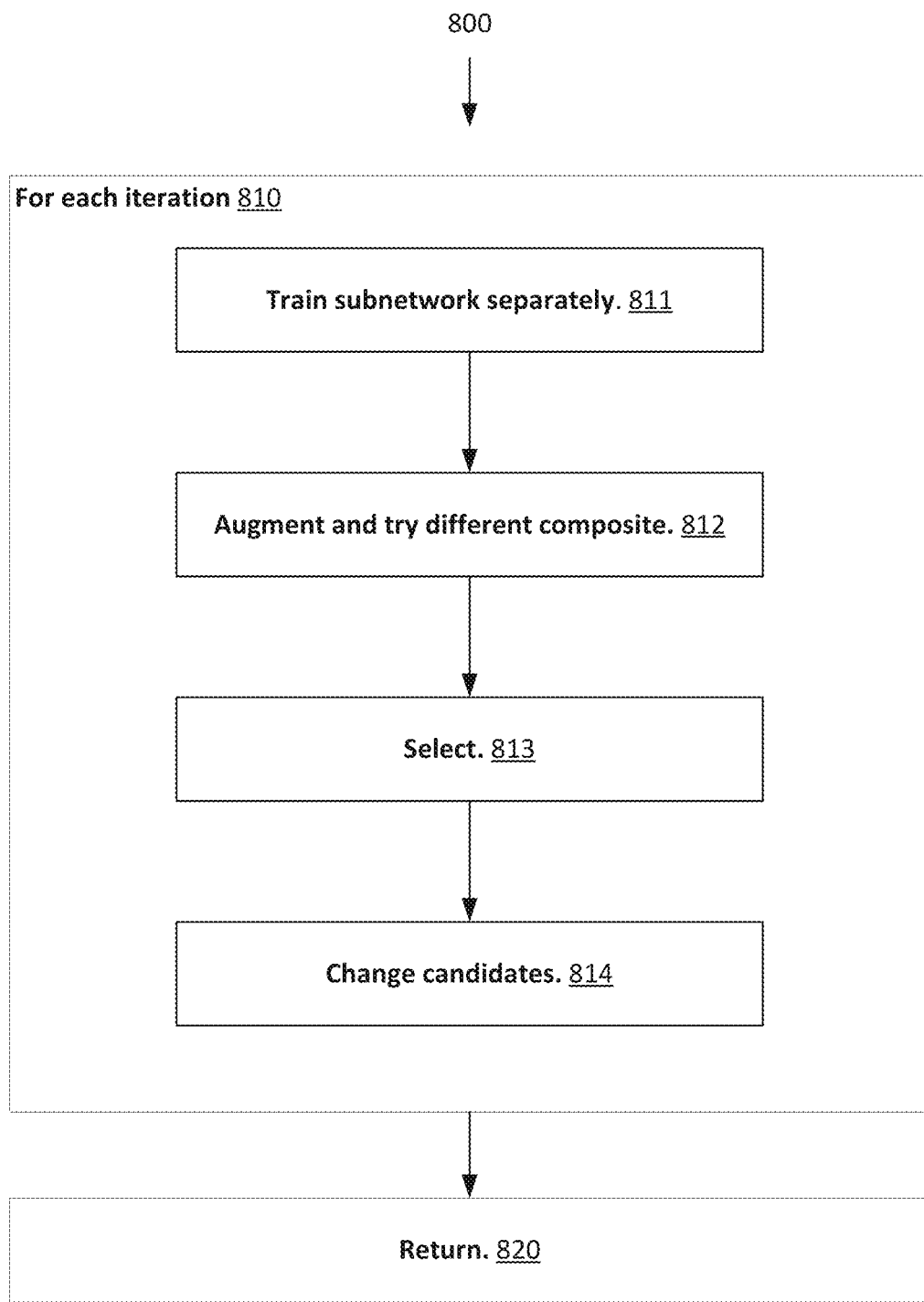
FIG. 8 is a flowchart of an algorithm for learning a composite machine learning model, according to some disclosed embodiments.

FIG. 8 is flowchart 800 of the composite neural network search algorithm, according to some disclosed embodiments. At block 810, blocks 811, 812, 813, and 814 represent operations performed for each iteration t of a total T number of iterations (e.g., for t: 1→T do . . . ). In the following, S represents the learning dataset exclusive of the test dataset and the user-designed metric function is represented as M.

At block 811, each candidate sub-neural network at the current iteration t is trained separately as in the following pseudo-code:

```
1:      For h in {h_{t,1}, h_{t,2}, ... , h_{t,m_{t+1}}}:
2:          h = WeakLearner(S, f_{t-1})
3:          w = Minimize(F_t(w, h))
```

At block 812, the current neural network at the current iteration t is augmented and a different composite neural network is tried as in the following pseudo-code:

```
1:      For i, h_i in {h_{t,1}*, h_{t,2}*, ... , h_{t,m_{t+1}}* }:
2:          f_t = f_{t-1} + w_i · h_i
3:          w_i = Minimize(F_t(w_i, h_i))
```

At block 813, a select operation is performed at the current iteration t as in the following pseudo-code:

```
01:     F_t, h*, w* = Minimize(M, {h_{t,1}*, h_{t,2}*, ... , h_{t,m_{t+1}}*})
```

At block 814, the set of candidate subnetworks is changed for the next iteration t+1 as in the following pseudo-code:

```
01:     {h_{t+1,1}, h_{t+1,2}, ..., h_{t+1,m_{t+1}}} = SelectCandidates({h_{t,1}*, h_{t,2}*, ... , h_{t,m_{t+1}}*})
```

After all iterations 810 are complete, then the algorithm returns 820 a composite neural network model $f_T$.

One example of a composite model learning algorithm that is used in some disclosed embodiments it the AdaNet algorithm described in the paper by Corinna Cortes, Xavier Gonzalvo, Vitaly Kuznetsov, Mehryar Mohri, Scott Yang, Proceedings of the 34th International Conference on Machine Learning, PMLR 70:874-883, 2017, Sydney, Australia, the entire contents of which is hereby incorporated by reference.

Learning Workflow

In this section, a more detailed step-by-step description of a possible learning workflow is presented, according to some disclosed embodiments. Suppose after t−1 iterations of the composite neural network search algorithm, a composite neural network model has been learned and the candidate pool in iteration t has been filled with small dynamic sub-neural networks.

Figure 9B:
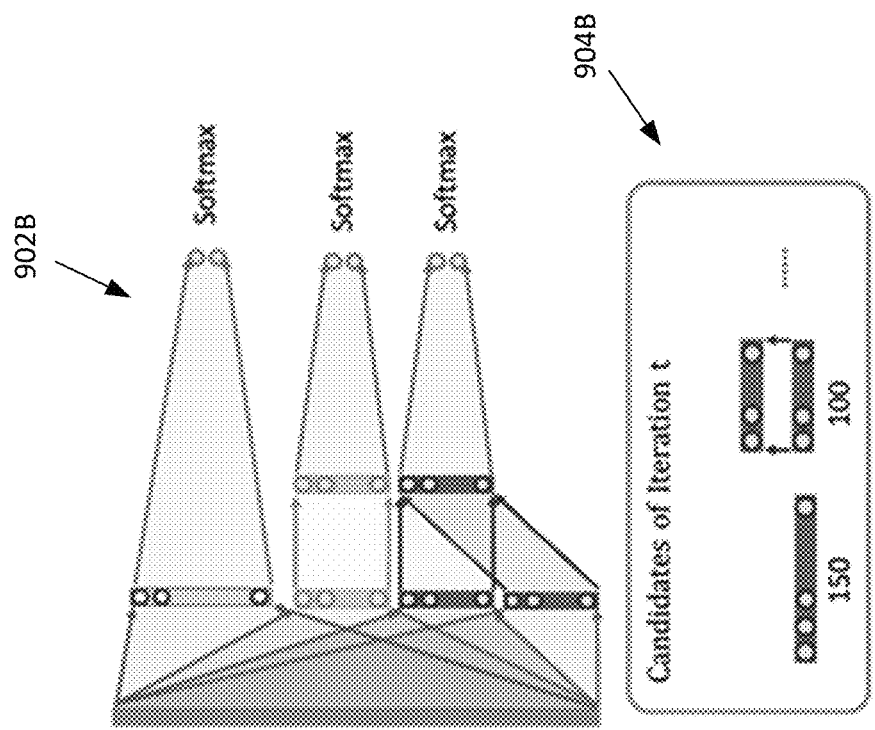
FIG. 9B shows an example composite neural network where all of the sub-neural networks in an example candidate pool are learned separately at an iteration of a composite neural network search algorithm, according to some disclosed embodiments.
Figure 9A:
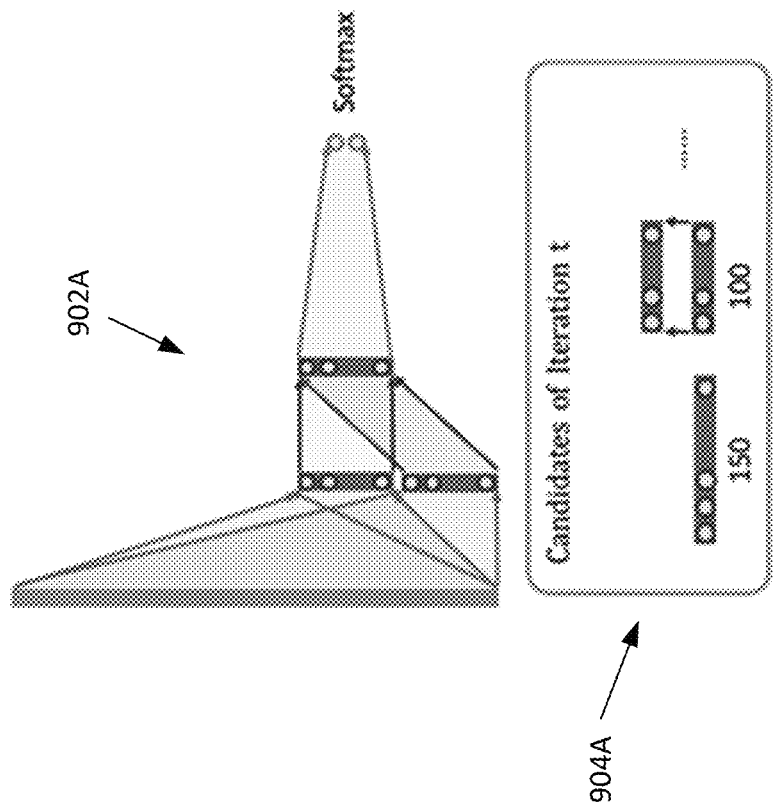
FIG. 9A shows an example composite neural network and an example sub-neural network candidate pool after an iteration of a composite neural network search algorithm, according to some disclosed embodiments.

For example, FIG. 9A shows example composite neural network 902A and example sub-neural network candidate pool 904A after iteration t−1 of the composite neural network search algorithm is complete and before iteration t commences, according to some disclosed embodiments. According to some disclosed embodiments, the composite model learning algorithm may perform the following operations at iteration t.

1) Stack more sub-neural networks to the composite neural network 902A after iteration t−1.

2) Select sub-neural networks for the next iteration t+1.

FIG. 9B shows example composite neural network 902B where all of the sub-neural networks in example candidate pool 904B are learned separately, according to some disclosed embodiments. Learning separately may encompass learning each sub-neural network with the same data input layer and a different respective output loss layer, as shown in FIG. 9B.

Figure 9D:
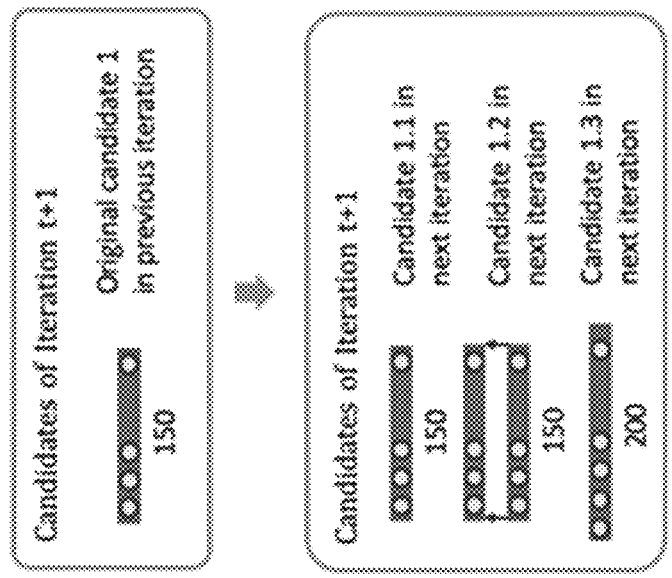
FIG. 9D illustrates how new sub-neural networks are selected and generated in a next candidate pool from one iteration of a composite neural network search algorithm to the next iteration of the algorithm, according to some disclosed embodiments.
Figure 9C:
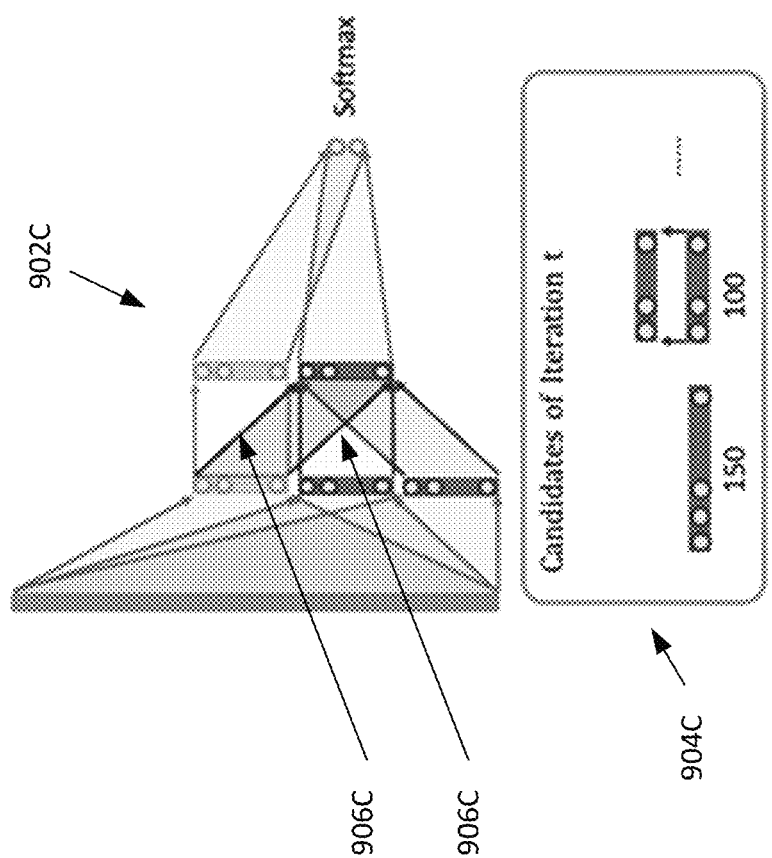
FIG. 9C shows an example composite neural network and an example candidate pool at an iteration of a composite neural network search algorithm, according to some disclosed embodiments.

Composite neural networks may be built between learned sub-neural networks and the composite neural network at the current iteration. All model parameters that have been learned in previous iterations will be inherited as the initialization in the current iteration. To connect the sub-neural network with current composite neural network, new connections are added from layer k of subnetwork to layer k+1 of the current composite neural network, which is represented by the area bounded by lines 906C in FIG. 9C. FIG. 9C shows current example composite neural network 902C and example candidate pool 904C at iteration t of the composite neural network search algorithm, according to some disclosed embodiments. FIG. 9C depicts the construction of a new composite neural network using a current composite neural network and a candidate sub-neural network. The best composite neural network after considering the candidates is selected as the new composite neural network at iteration t. In doing so, previously learned parameters of sub-neural networks are used as initialization. The composite neural network is co-learned on extra data steps with newly added weights. It should be noted that there is no connection added from layer k of the current composite neural network to layer k+1 of the sub-neural network.

At iteration t, all composite neural networks are evaluated, and the best composite neural network is retained. All sub-neural networks may be ranked according the evaluation results and the top sub-neural network may be retained for the next iteration t+1. New candidate sub-neural networks may be generated based on the best-performing sub-neural networks under specified augmentation options described above.

A new composite neural network may be created after iteration t based on the composite neural network created at iteration t−1 and a newly added sub-neural network selected from the candidate pool. A new candidate pool is created at iteration t+1 according to the updated evaluation results of iteration t. Both the composite neural network and the candidate pool are available for the next iteration t+1. FIG. 9D illustrates how new sub-neural networks are selected and generated in the next candidate pool from iteration t to iteration t+1, according to some disclosed embodiments.

Technical Challenges with Composite Model Search Algorithms

A composite model search algorithm involves iteratively learning multiple lightweight sub-models and creating composite models based thereon. To create composite models, models trained on different data partitions of the learned dataset at different workers in a distributed learning system must be synchronized to obtain an optimal sub-model. Therefore, in a conventional sequential learning strategy, an expensive cluster-level synchronization of model parameters at the end of each sub-model learning task may be required. This requirement can be a severe bottleneck to making a composite model search algorithm scalable on a large-scale cluster due to straggler effects and heavy network communication latency during synchronization.

On a cluster with multiple workers in a distributed learning system, a straggler worker may still be working on its share of the parallelized computation when most or all of the other workers have completed their shares. This uneven worker performance can be termed the straggler effect, which dramatically slows down the distributed learning process, especially when the capacity of the distributed learning system is relatively large. The capacity of the distributed learning system can be affected by a variety of factors including the number of worker computing nodes, the size of the learning dataset in terms of number of bytes, and the depth and width of the sub-models (e.g., depth and width of sub-neural networks). Apart from straggler effect, some other unpleasant phenomena are observed to cause latencies during distributed composite model learning. For example, synchronization time among all workers can be multiple times more than the computation time.

Ideal Distributed Learning Parallelization in a Distributed Learning System

Figure 10A:
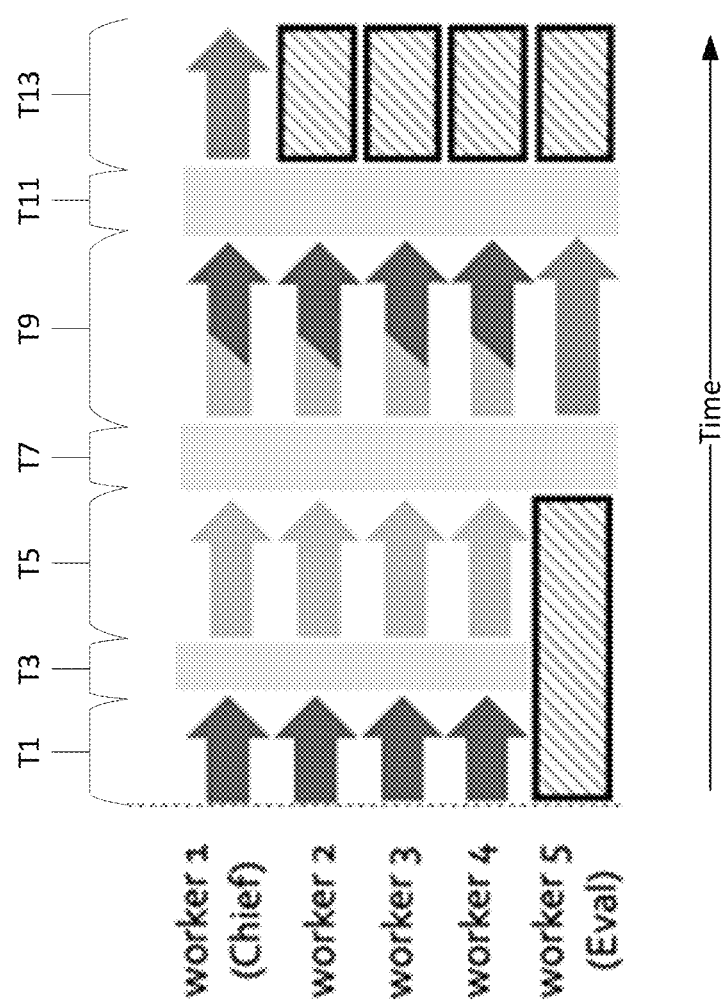
FIG. 10A depicts an ideal execution of a composite model search algorithm on a group of worker computing nodes in a distributed learning system, according to some disclosed embodiments.

FIG. 10A illustrates ideal distributed composite model learning parallelization in a distributed learning system, according to some embodiments. In this example and other examples provided herein, there are five worker computing nodes in a worker group of the distributed learning system. However, in a given implementation there may be more or fewer workers (e.g., twenty workers) in a worker group.

One of the workers (Worker 1) in the worker group is a "chief" worker that performs model structure adjustment operations of a composite model search algorithm such as, for example, the AdaNet algorithm mentioned above. Structure adjustment operations may encompass horizontally or vertically stacking sub-models (e.g., sub-neural networks) to form an intermediate or final composite model (e.g., an intermediate or final composite neural network). Another example of a structure adjustment operation in the neural network context is generating a new dense, fully connected layer to connect multiple sub-neural networks.

Another of the workers (Worker 5) in the worker group is an "evaluation" worker that performs model evaluation operations of the composite model search algorithm. Model evaluation operations may encompass computing recall, precision, accuracy, F1 score, and/or perplexity scores such as, for example, for a natural language processing task. The model evaluation operations may be user defined or user specified according to the requirements of the particular implementation at hand including the type of machine learning task at hand. Model evaluation operations may also encompass measuring the stopwatch time per iteration of the composite model search algorithm to monitor computing efficiency of the algorithm.

Ideally, during a first period of time T1, Workers 1-4 learn a first sub-model in parallel according to the composite model search algorithm. All Workers 1-4 complete their respective learning tasks at the same time such that none of the Workers 1-4 must wait for another of the Workers 1-4 to complete their respective learning task before the synchronization process can begin at time T3 after time T1.

The synchronization process may involve parameter communication over a data communications network (e.g., an IP-based network) between worker nodes in a worker node group. In particular, a worker in the worker group may communicate its partial model parameters to each of the other workers in the worker group that computed partial model parameters. For example, at time T3, Worker 1 may communicate its partial model parameters to each of Workers 2, 3, and 4. Likewise, at time T3, Worker 2 may communicate its partial model parameters to each of Workers 1, 3, and 4, Worker 3 may communicate its partial model parameters to each of Workers 1, 2, and 4, and Worker 4 may communicate its partial model parameters to each of Workers 1, 2, and 3. Thus, each of Workers 1-4 involved in learning the first sub-model received may each other's partial model parameters during the synchronization process at time T3.

In addition to, or as an alternative to, exchanging partial model parameters, the synchronization process may involve exchanging partial gradients and/or other computation results such as, for example, intermediate values. At the start of the synchronization process, each worker may setup a network communications channel (e.g., a transmission control protocol (TCP) connection) with each of the other workers. Over these established communications channels, each worker can receive partial model parameters, partial gradients, and/or other computation results from other workers in the worker group. A worker may use the information received from other workers during the synchronization process to perform further computation such as, for example, neural network computation and/or back propagation of gradients.

Once the synchronization process at time T3 is complete, all Workers 1-4 learn a second sub-model in parallel according to the composite model search algorithm. During time period T5 after T3, all Workers 1-4 complete their respective learning tasks for the second sub-model at the same time such that none of the Workers 1-4 must wait for another of the Workers 1-4 to complete their respective learning task for the second sub-model before the synchronization process can begin at time T7 after time T5.

During time period T9 after T7, all Workers 1-4 learn a first composite model composed of the first sub-model and the second sub-model in parallel according to the composite model search algorithm. All Workers 1-4 complete their respective tasks at the same time such that none of the Workers 1-4 must wait for another of the Workers 1-4 to complete their respective learning task before the synchronization process can begin at time T11 after time T9. The evaluation Worker 5 is idle until time period T9 when the evaluation Worker 5 performs evaluation operations. The chief Worker 1 performs model structure adjustment operations during time T13 while Workers 2-5 are idle.

In the ideal situation, a worker performing a learning task on a sub-model need not wait for (be idle while) another worker is still performing a learning task on the sub-model. In other words, ideally there are no stragglers. Also, the network communication overhead during synchronization is ideally kept to a minimum. In other words, ideally the synchronization time is minimized.

Practical Distributed Learning Parallelization in a Distributed Learning System

In practice, the learning tasks for a sub-model may take longer for some workers than other workers. In addition, the synchronization process of parameters among workers takes time because of the network communications involved.

Figure 10B:
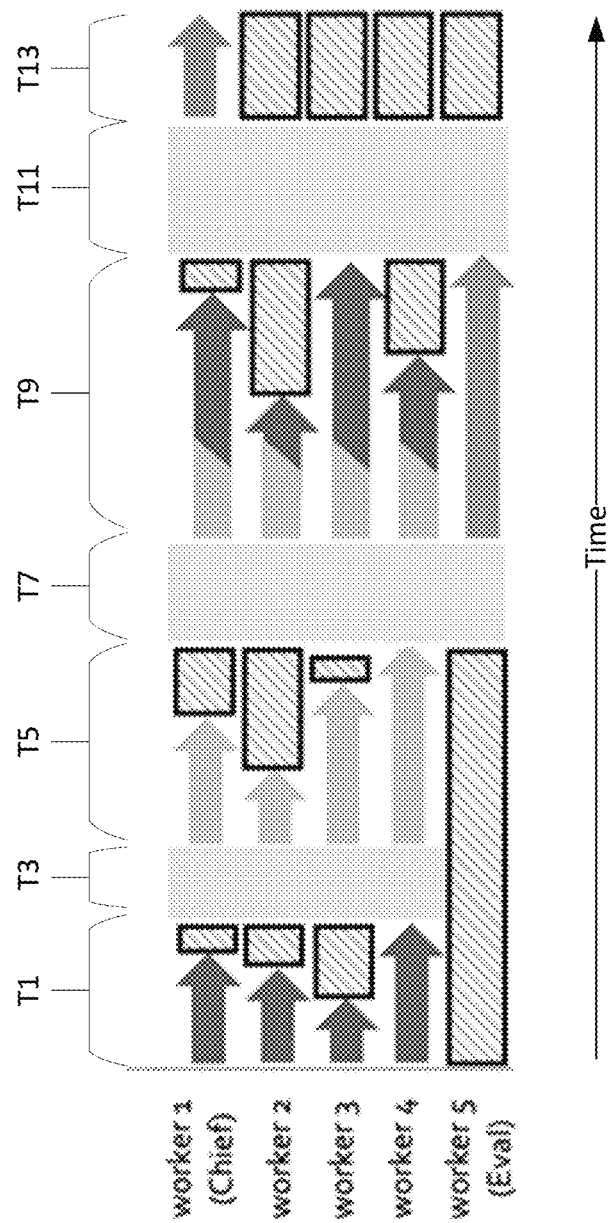
FIG. 10B depicts a practical execution of a composite model search algorithm on a group of worker computing nodes in a distributed learning system, according to some disclosed embodiments.

Following the example of FIG. 10A, FIG. 10B illustrates a practical distributed composite model learning parallelization in a distributed learning system, according to some embodiments. As can be seen, Workers 1-3 must wait for Worker 4 to complete its sub-model learning task before the synchronization process at time T3 can begin. Similarly, the synchronization process at time T7 must wait for straggler Worker 4 to complete it sub-model learning task before the synchronization process at time T7 can begin. During this time, Workers 1-3 are idle. Likewise, the synchronization process at time T11 must wait for straggler Worker 3 to complete its sub-model learning task before the synchronization process at Time T11 can begin. Meanwhile, Workers 1, 2, and 4 are idle.

Network-Level Asynchronous Distributed Learning Strategy

In order to reduce straggler effect and communication latency during synchronization, a network-level asynchronous distributed learning strategy is used, according to some disclosed embodiments. In asynchronous distributed training strategy of, workers may perform further learning tasks immediately after completing a previous learning task. More specifically, in a cluster with data parallelism, sub-models are learned separately with different shares of workers. One worker may immediately start a learning task for a next sub-model after completing a learning task for a previous sub-model and need not wait for other workers to finish their learning tasks for the previous sub-model.

According to some disclosed embodiments, sub-models may be trained separately with different shares of workers according to the complexity of their architectures. Compared to traditional distributed training strategy, the network-level asynchronous distributed learning strategy performs distributed learning in the level of sub-models to reduce the number of individual workers involved in the learning of one sub-model. More specifically, in one iteration of a composite model search algorithm such as, for example, the AdaNet algorithm discussed above, sub-models are learned separately in parallel with different shares of workers. The number of workers that are allocated to a sub-model may vary based on the sub-model's structural complexity. For example, the number of workers allocated to the sub-model may depend on the width and depth of the sub-model (e.g., a sub-neural network). For example, if the sub-model is a neural network, the number of workers allocated can be determined based on the number of hidden units and the number of connections of the neural network. For example, consider three sub-neural networks, one of them, network A, is fully connected and has 3 layers where each of the layers has 10 units. Thus, neural network A has 30 hidden units in total and 10×10+10×10=200 connections. Two other networks, network B and C, are each fully connected and have 2 layers, each of which has 5 units. Thus, each of neural networks B and C each has 10 units and 25 connections total. The number of workers allocated to a sub-neural network can be based on the ratio of hidden layer connections. For example, if there are M number of workers (e.g., twenty) in the worker group to which to allocate to sub-neural networks A, B, and C above, then the number of workers in the worker group allocated to sub-neural networks A, B, and C can be computed as follows:

| Example Sub-Neural Network | Number of Workers Allocated (M = 20) |
| --- | --- |
| A | M*(200/250) = 16 |
| B | M*(25/250) = 2 |
| C | M*(25/250) = 2 |

The number of workers allocated to a sub-neural network can be based on the ratio of hidden layer units. For example, if there are M number of workers (e.g., twenty) in the worker group to which to allocate to sub-neural networks A, B, and C above, then the number of workers in the worker group allocated to sub-neural networks A, B, and C can be computed as follows:

| Example Sub-Neural Network | Number of Workers Allocated (M = 20) |
| --- | --- |
| A | M*(30/50) = 12 |
| B | M*(10/50) = 4 |
| C | M*(10/50) = 5 |

In comparison, with a conventional distributed learning strategy, learning of sub-models is sequential using all available workers in a worker group, except for possibly an evaluation worker. Therefore, worker group-level synchronization involving all available workers in the worker group occurs more frequently compared to the network-level asynchronous distributed learning strategy. In contrast, with the network-level asynchronous strategy, different subsets of all available workers in the worker group are used to learn different sub-models, thereby reducing the number of workers involved in a synchronization for a sub-model. By reducing the number of workers involved in a synchronization, the associated network communication overhead in terms of network bandwidth consumed by the synchronization is reduced.

Figure 11A:
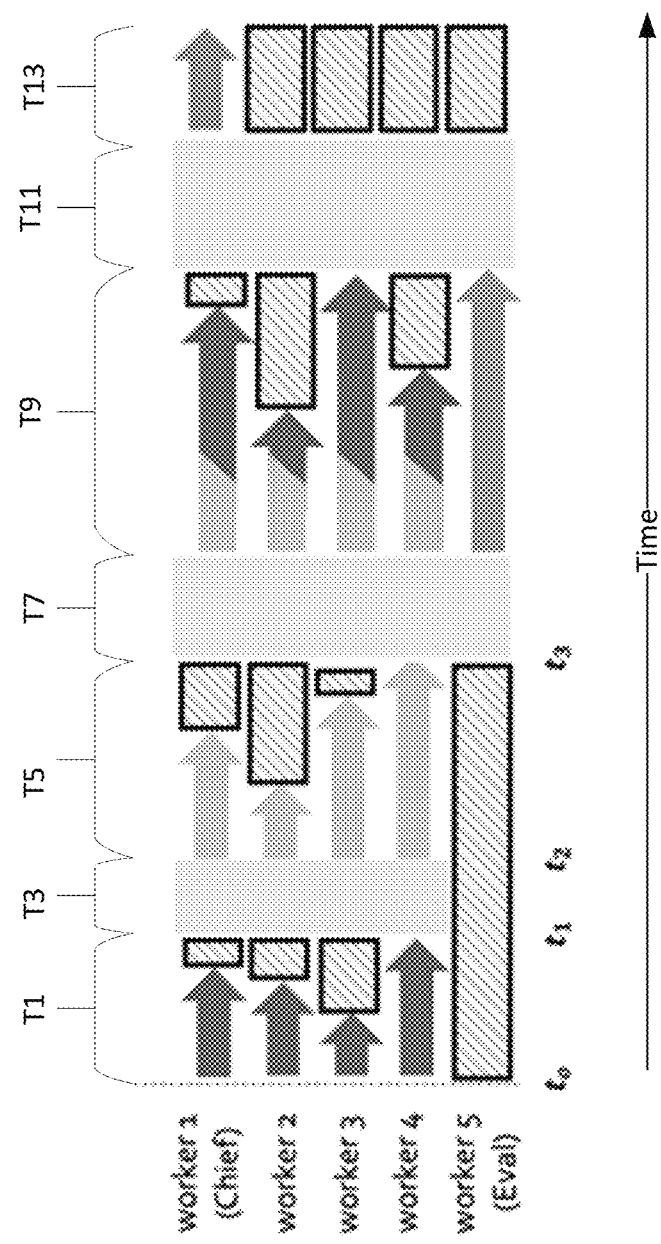
FIG. 11A depicts an execution of a composite model search algorithm on a group of worker computing nodes in a distributed learning system according to a conventional distributed learning strategy, according to some disclosed embodiments.

FIG. 11A depicts the conventional distributed learning strategy, according to some embodiments. Learning a first sub-model occupies Workers 1-4 for time period T1 from time to to $t_1$. Learning a second sub-model occupies Workers 1-4 for time period T5 after time period T1 from time $t_2$ to time $t_3$. Note that the synchronization process during time period T3 and time period T7 occupies all four Workers 1-4.

Figure 11B:
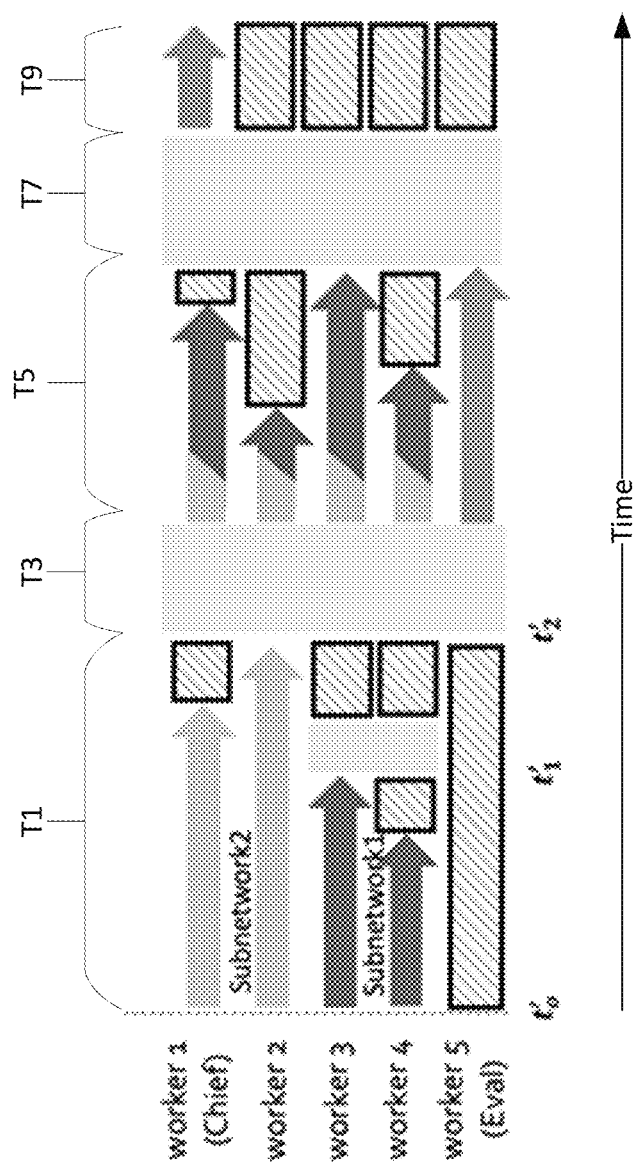
FIG. 11B depicts an execution of a composite model search algorithm on a group of worker computing nodes in a distributed learning system according to a network-level asynchronous distributed learning strategy, according to some disclosed embodiments.

In contrast, FIG. 11B depicts the network-level asynchronous distributed learning strategy, according to some embodiments. Learning the second sub-model occupies only Workers 1, 2 during time period T1, which is less than the four Workers 1-4 available. Learning the first sub-model occupies only Workers 3, 4 during time period T1. Because learning the first sub-model occupies only two Workers 3, 4 (instead of four Workers as in FIG. 11A), the first synchronization at time $t_1'$ in FIG. 11B for the first sub-model has less network communication overhead in terms of network bandwidth consumed than the synchronization for the first sub-model at time T3 in FIG. 11A. Also, while the first sub-model is learned by Workers 3, 4, the second sub-model is learned by Workers 1, 2. In particular, unlike a conventional distributed learning strategy, sub-models are learned in parallel on different workers.

With a conventional distributed learning strategy, once a sub-model learning task is completed by a worker, and before the worker group begins to build composite models, the worker may be idle while other workers (stragglers) in the worker group finish their sub-model learning tasks. This slows the overall execution of the composite model search algorithm on the worker group.

Figure 12:
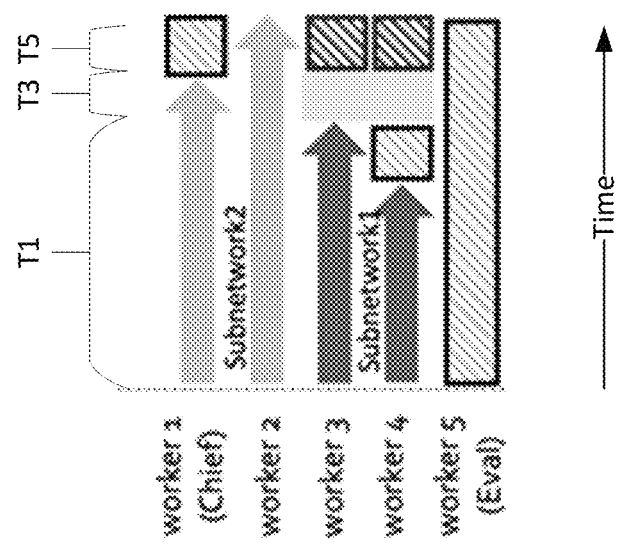
FIG. 12 depicts a straggler effect that can occur when executing a composite model search algorithm on a group of worker computing nodes in a distributed learning system according to a network-level asynchronous distributed learning strategy, according to some disclosed embodiments.

FIG. 12 illustrates the straggler effect in a worker group of a distributed learning system where the network-level asynchronous distributed learning strategy is employed, according to some disclosed embodiments. As shown, Workers 3, 4, each perform a learning task for a first sub-model during time T1. During time T3 after time T1, a synchronization process for the first sub-model is performed involving Workers 3, 4. However, during time T5 after time T3, Workers 3, 4 are idle (e.g., not performing a learning task) while waiting for Workers 1, 2 to complete their respective learning tasks for a second sub-model.

According to some disclosed embodiments, to reduce or eliminate this type of straggler effect, the network-level asynchronous distributed learning strategy may encompass scheduling a worker in a worker group that has completed a learning task for one sub-model to perform a learning task for a new sub-model without waiting for other workers in the worker group to complete their respective learning tasks. The new sub-model can one for the current iteration of the composite model search algorithm or a predicted candidate sub-model for the next iteration of the search algorithm. Thus, the network-level asynchronous distributed learning strategy can facilitate earlier starts of learning candidate sub-models, compared to a conventional distributed learning approach.

In the next iteration of the composite model search algorithm, an early-started sub-model from a prior iteration that is retained in the sub-model candidates pool for the next iteration can be part of a composite model without requiring further re-learning of the early-started sub-model at the next iteration. This can significantly improve the overall latency of the composite model search algorithm. An early-started sub-model from a prior iteration that is not retained in the sub-model candidates pool for the next iteration can be discarded (abandoned). Consequently, the early-starting of sub-model earning can be viewed as a trade-off between learning task redundancy and reducing straggler effects in the gap between the learning of each sub-model within one iteration of the composite model search algorithm.

Figure 13A:
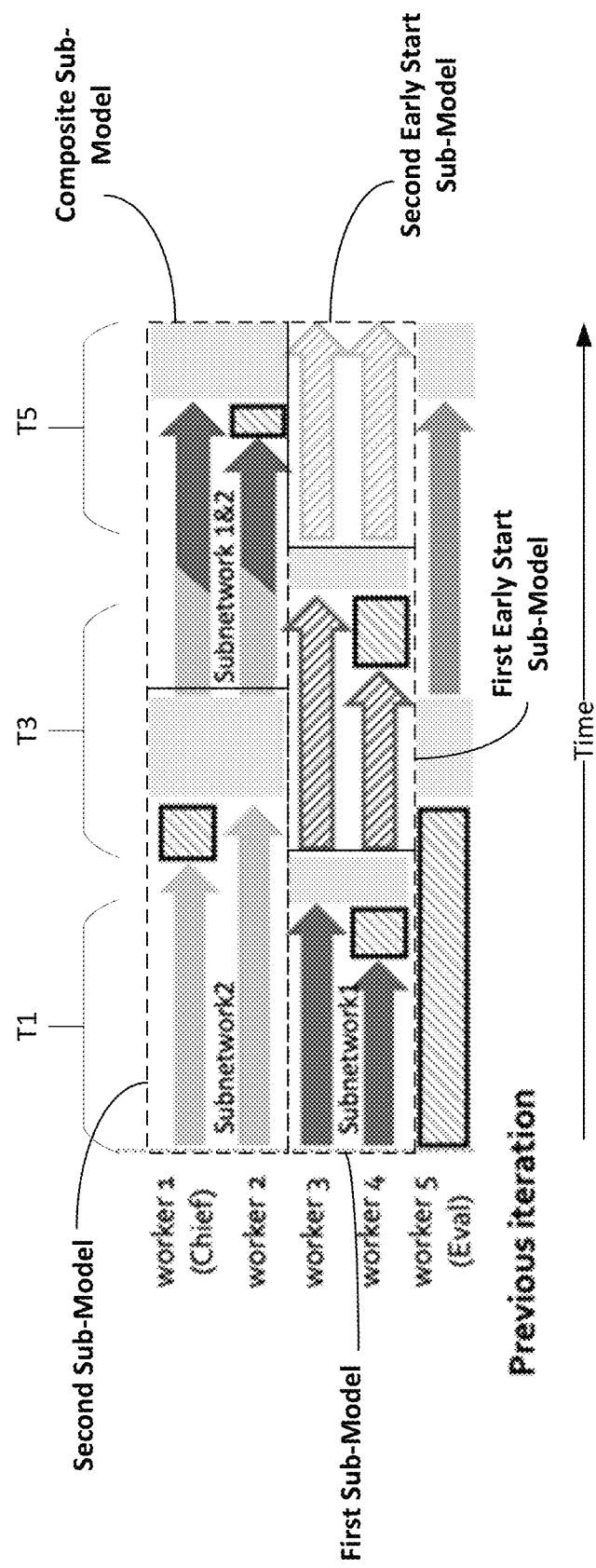
FIG. 13A depicts sub-model learning early start when executing an iteration of a composite model search algorithm on a group of worker computing nodes in a distributed learning system according to a network-level asynchronous distributed learning strategy, according to some disclosed embodiments.

FIG. 13A depicts a previous iteration of a composite model search algorithm according to the network-level asynchronous distributed learning strategy, according to some embodiments. During time T1, Workers 3, 4 perform respective learning tasks for a first sub-model and Workers 1, 2 perform respective learning tasks for a second sub-model. After the synchronization process for the first sub-model is complete, Workers 3, 4 are immediately scheduled to perform respective learning tasks for a first early start sub-model during time T3 without waiting for Workers 1, 2 to complete their respective learning tasks for the second sub-model. After the synchronization process for the second sub-model is complete, Workers 1, 2 are scheduled to perform respective learning tasks for a composite sub-model composed of the first sub-model and the second sub-model. After the synchronization process for the first new sub-model is complete after time T3, Workers 3,4 are scheduled to perform respective learning tasks for a second early start sub-model during time T5 without waiting for Workers 1, 2, to complete their respective learning tasks for the composite sub-model.

Figure 13B:
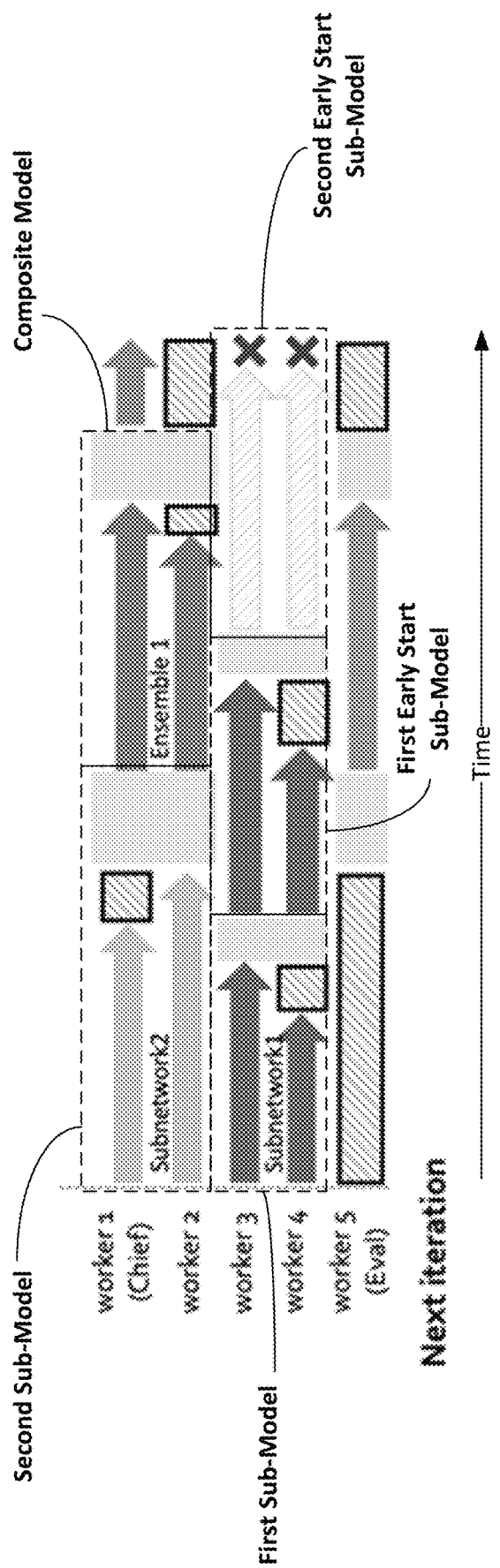
FIG. 13B depicts sub-model learning early start when executing an iteration of a composite model search algorithm on a group of worker computing nodes in a distributed learning system according to a network-level asynchronous distributed learning strategy, according to some disclosed embodiments.

FIG. 13B depicts the next iteration of the composite model search algorithm after the previous iteration depicted in FIG. 13A, according to some disclosed embodiments. In this example, the first early start sub-model was retained in the candidates pool for the next iteration. Because of the early start during the previous iteration, the first early start sub-model does not need to be re-learned during the next iteration. In this example, the second early start sub-model was not retained in the candidates pool for the next iteration, and thus is discarded at the next iteration.

Task Scheduler

Figure 14:
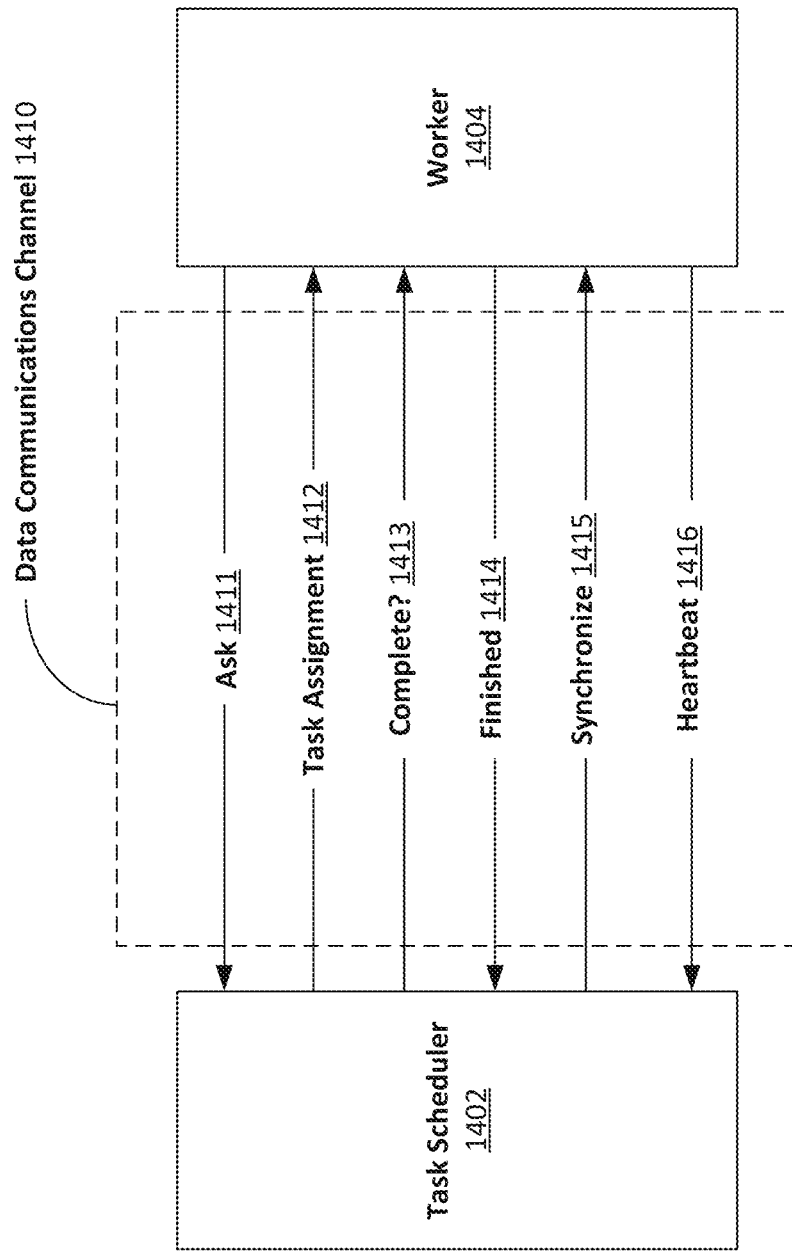
FIG. 14 illustrates network communications between a task scheduler of a worker group in a distributed learning system and a worker in the worker group implementing the network-level asynchronous distributed learning strategy, according to some embodiments.

FIG. 14 illustrates network communications between task scheduler 1402 of a worker group in a distributed learning system and worker 1404 in the worker group implementing the network-level asynchronous distributed learning strategy, according to some embodiments. For example, in the context of distributed learning system 700 of FIG. 7, task scheduler 1402 may correspond to task scheduler 722-2 and worker 1404 may correspond to a worker in worker group 720-2.

Initially, task scheduler 1402 sets up data communications channel 1410 with worker 1404. Task scheduler 1402 may setup similar but separate data communications channels with other workers in the worker group to which worker 1404 belongs. Data communications channel 1410 can be a transmission control protocol (TCP) network connection or other type of bidirectional data communications network connection. Various network messages 1411, 1412, 1413, 1414, 1415, and 11416 may be sent between task scheduler 1402 and worker 1404 over data communications channel 1410 to facilitate the network-level asynchronous distributed learning strategy. Like messages may be sent between task scheduler 1402 and other words in the worker group over respective data communications channels to facilitate the network-level asynchronization distributed learning strategy.

When worker 1404 is idle or otherwise not performing a machine learning tasks or model synchronization, worker 1404 may ask 1411 task scheduler 1402 for work. When task scheduler 1402 is ready to assign a machine learning task to worker 1404 it may do so via task assignment 1412. Task assignment 1412 may include an indication of the machine learning task to be performed (e.g., gradient computation), training hyperparameters (e.g., learning rate, objective function, etc.), and system-level information such as, for example, a kind of distributed storage to use. Worker 1404 may immediately begin performing an assigned machine learning task upon receiving task assignment 1412 from task scheduler 1402. Task assignment 1412 may indicate or specify a time at which worker 1404 is to begin performance of the assigned machine learning task.

Worker 1404 may perform a machine learning task at least partially in parallel with other machine learning tasks performed by other workers in the worker group as assigned by task scheduler 1402. Here, "at least partially in parallel" encompasses two or more workers in a worker group performing respective machine learning tasks at the same time where the machine learning tasks performed at least partially in parallel can, but need not, start and/or end at the same time. In other words, two machine learning tasks can be said to be performed at least partially in parallel if performance of the two machine learning tasks overlaps in time and the two machine learning tasks start at the same or different times and the two machine learning tasks end at the same or different times.

While worker 1404 is performing an assigned machine learning task, task scheduler 1402 may periodically ask 1413 worker 1404 if worker 1404 has completed the task. For example, task scheduler 1402 may ask 1413 worker 1404 every few seconds. Worker 1404 may reply with heartbeat 1416 that indicates to task scheduler 1402 that worker 1404 is still performing the assigned machine learning task. Heartbeat 1416 may also provide progress information such as how much (e.g., a percentage or an amount) of the assigned task has been completed or remains to be completed. Once worker 1404 completes the assigned machine learning task, it may inform task scheduler 1402 that it has finished 1414 the assigned task.

Once task scheduler 1402 has detected that all workers assigned a machine learning task for learning a sub-model have finished (e.g., 1414) their respective tasks, task scheduler 1402 may instruct worker 1404 to synchronize 1415 their respective learned portions of the sub-model with the other workers assigned a machine learning task for learning the sub-model. Once worker 1404 has completed its portion of the synchronization with the other workers, it may again ask 1411 for a next machine learning task.

Computing System Implementation

Some disclosed embodiments may encompass performance of a method by a computing system having one or more processors and storage media. The one or more processors and the storage media can be provided by one or more computing devices. The storage media of the computing system can store one or more computer programs. The one or more programs can include instructions configured to perform the method. The instructions may be executed by the one or more processors to perform the method. Some disclosed embodiments can encompass one or more non-transitory computer-readable media. The one or more non-transitory computer-readable media may store the one or more computer programs that include the instructions configured to perform the method. Some disclosed embodiments can encompass the computing system having the one or more processors and the storage media storing the one or more computer programs that include the instructions configured to perform the method. Some disclosed embodiments can encompass one or more virtual machines that logically operate on top of one or more computing devices and emulate hardware. A virtual machine can be a Type-1 or Type-2 hypervisor, for example. Operating system virtualization using containers is also possible instead of, or in conjunction with, hardware virtualization using hypervisors.

In some disclosed embodiments that encompasses multiple computing devices, the computing devices may be arranged in a distributed, parallel, clustered or other suitable multi-node computing configuration in which computing devices are continuously, periodically, or intermittently interconnected by one or more data communications networks (e.g., one or more internet protocol (IP) networks.) Further, it need not be the case that the set of computing devices that execute the instructions be the same set of computing devices that provide the storage media storing the one or more computer programs, and the sets may only partially overlap or may be mutually exclusive. For example, one set of computing devices may store the one or more computer programs from which another, different set of computing devices downloads the one or more computer programs and executes the instructions thereof.

Computing Device

Figure 15:
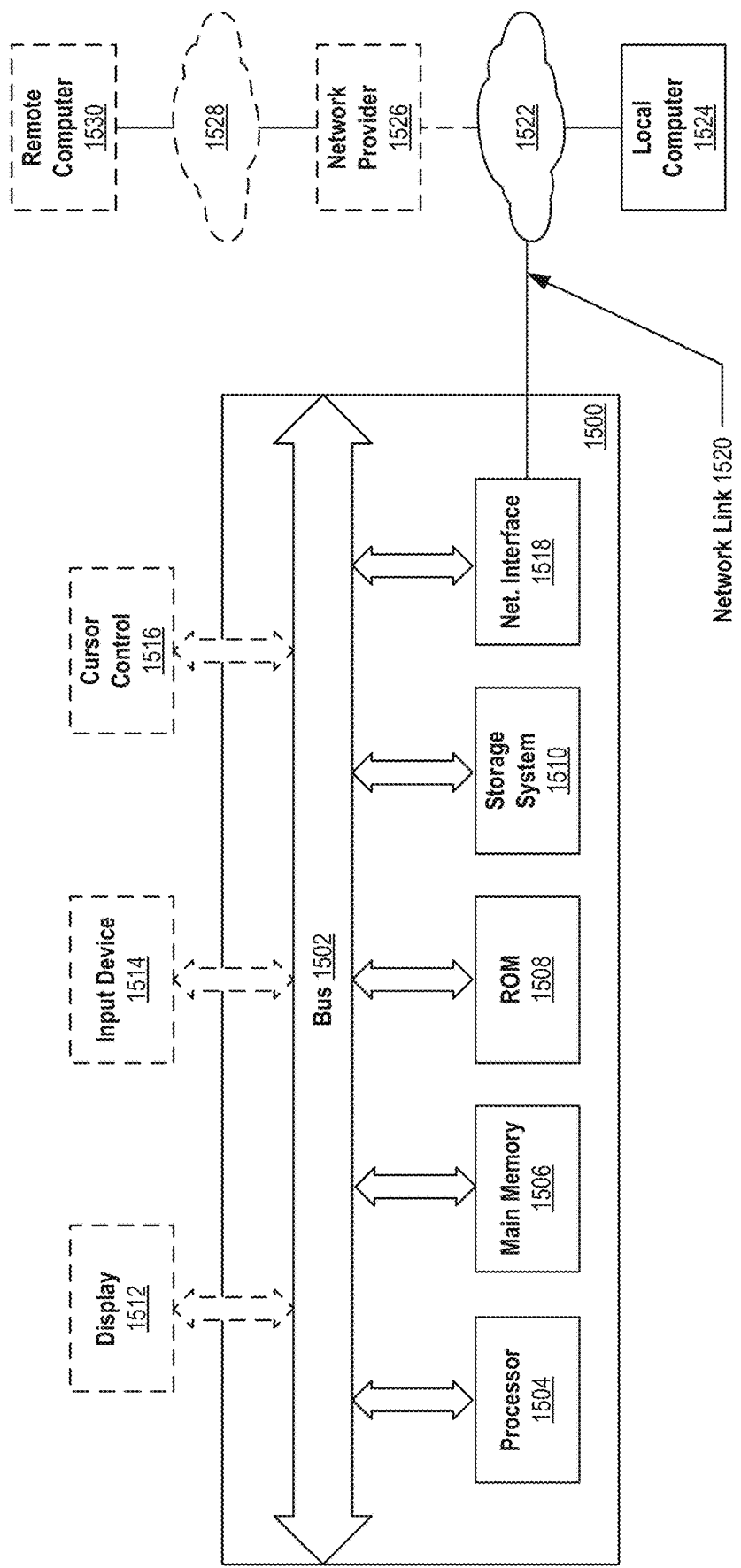
FIG. 15 is a block diagram that illustrates a computing device upon used in some disclosed embodiments.

FIG. 15 is a block diagram of a computing device 1500 used in some possible embodiments of the present invention. Computing device 1500 includes bus 1502 or other communication mechanism for communicating information, and one or more hardware processors 1504 coupled with bus 1502 for processing information.

Hardware processor 1504 may include, for example, one or more general-purpose microprocessors, central processing units (CPUs) or cores thereof, graphics processing units (GPUs), tensor processing units (TPUs), or systems on a chip (SoCs).

Computing device 1500 also includes a main memory 1506, which may be implemented by one or more volatile memory devices, coupled to bus 1502 for storing information and instructions to be executed by processor 1504. Main memory 1506 also may be used for storing temporary variables or other intermediate information during execution of instructions by processor 1504.

Computing device 1500 may also include read-only memory (ROM) 1508 or other static storage device coupled to bus 1502 for storing static information and instructions for processor 1504.

A storage system 1510, which may be implemented by one or more non-volatile memory devices, is provided and coupled to bus 1502 for storing information and instructions.

Computing device 1500 may be coupled via bus 1502 to display 1512, such as a liquid crystal display (LCD), a light emitting diode (LED) display, or a cathode ray tube (CRT), for displaying information to a computer user. Display 1512 may be combined with a touch sensitive surface to form a touch screen display. The touch sensitive surface may be an input device for communicating information including direction information and command selections to processor 1504 and for controlling cursor movement on display 1512 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 1514, including alphanumeric and other keys, may be coupled to bus 1502 for communicating information and command selections to processor 1504.

Another type of user input device may be cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Instructions, when stored in non-transitory storage media accessible to processor 1504, such as, for example, main memory 1506 or storage system 1510, render computing device 1500 into a special-purpose machine that is customized to perform the operations specified in the instructions. Alternatively, customized hard-wired logic, one or more ASICs or FPGAs, firmware and/or hardware logic which in combination with the computing device causes or programs computing device 1500 to be a special-purpose machine.

A computer-implemented process may be performed by computing device 1500 in response to processor 1504 executing one or more sequences of one or more instructions contained in main memory 1506. Such instructions may be read into main memory 1506 from another storage medium, such as storage system 1510. Execution of the sequences of instructions contained in main memory 1506 causes processor 1504 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 1510) and/or volatile media (e.g., main memory 1506). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 1502. Transmission media can also take the form of acoustic or light waves, such as those generated during radio-wave and infra-red data communications.

Computing device 1500 also includes a network interface 1518 coupled to bus 1502. Network interface 1518 provides a two-way data communication coupling to a wired or wireless network link 1520 that is connected to a local, cellular or mobile network 1522. For example, communication interface 1518 may be IEEE 802.3 wired "ethernet" card, an IEEE 802.11 wireless local area network (WLAN) card, an IEEE 1502.15 wireless personal area network (e.g., Bluetooth) card or a cellular network (e.g., GSM, LTE, etc.) card to provide a data communication connection to a compatible wired or wireless network. Communication interface 1518 may send and receive electrical, electromagnetic or optical signals that carry digital data streams representing various types of information.

Network link 1520 typically provides data communication through one or more networks to other data devices. For example, network link 1520 may provide a connection through network 1522 to local computing device 1524 that is also connected to network 1522 or to data communication equipment operated by a network access provider 1526 such as, for example, an internet service provider or a cellular network provider. Network access provider 1526 in turn provides data communication connectivity to another data communications network 1528 (e.g., the internet). Networks 1522 and 1528 both use electrical, electromagnetic or optical signals that carry digital data streams. The signals through the various networks and the signals on network link 1520 and through communication interface 1518, which carry the digital data to and from computing device 1500, are example forms of transmission media.

Computing device 1500 can send messages and receive data, including program code, through the networks 1522 and 1528, network link 1520 and communication interface 1518. In the internet example, a remote computing device 1530 might transmit a requested code for an application program through network 1528, network 1522 and communication interface 1518. The received code may be executed by processor 1504 as it is received, and/or stored in storage device 1510, or other non-volatile storage for later execution.

CONCLUSION

In the foregoing detailed description, some disclosed embodiments have been described with reference to numerous specific details that may vary from implementation to implementation. The detailed description and the figures are, accordingly, to be regarded in an illustrative rather than a restrictive sense.

A reference in the detailed description to some disclosed embodiments is not intended to mean that the embodiment(s) is/are exclusive of other disclosed embodiments, unless the context clearly indicates otherwise. Thus, a disclosed embodiment may be combined with one or more other disclosed embodiments in a particular combination, unless the context clearly indicates that the disclosed embodiments are incompatible.

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the present invention. The first user interface and the second user interface are both user interfaces, but they are not the same user interface.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

The invention claimed is:

1. A method performed by a computing system having one or more processors, the method comprising:
assigning a respective machine learning task for learning a first machine learned sub-neural network to each worker node in a first plurality of worker nodes and assigning a respective machine learning task for learning a second machine learned sub-neural network to each worker node in a second plurality of worker nodes such that each worker node in the first plurality of worker nodes and in the second plurality of worker nodes performs the respective machine learning task at least partially in parallel with at least one other of the respective machine learning tasks assigned to first plurality and second plurality of worker nodes;
based on detecting that the first plurality of worker nodes has completed the respective machine learning tasks assigned to the first plurality of worker nodes, commanding the first plurality of worker nodes to perform a synchronization process for the first machine learned sub-neural network; and
based on detecting that the second plurality of worker nodes has completed the respective machine learning tasks assigned to the second plurality of worker nodes, commanding the second plurality of worker nodes to perform a synchronization process for the second machine learned sub-neural network.

2. The method of claim 1, further comprising:
based on the detecting that the first plurality of worker nodes have completed the synchronization process for the first machine learned sub-neural network, assigning a respective machine learning task for learning a third machine learned sub-neural network to each worker node in the first plurality of worker nodes such that each worker node in the first plurality of worker nodes performs the respective machine learning task for the third machine learned sub-neural network at least partially in parallel with at least one of the respective machine learning tasks for the second machine learned sub-neural network assigned to the second plurality of worker nodes.

3. The method of claim 2, further comprising:
discarding the third machine learned sub-neural network at an iteration of a composite neural network search algorithm.

4. The method of claim 1, further comprising:
selecting a number of worker nodes to perform respective machine learning tasks for the first machine learned sub-neural network based on a number of hidden layer units of the first machine learned sub-neural network; and
assigning the respective machine learning task for learning the first machine learned sub-neural network to each worker node in the first plurality of worker nodes based on the selected number of worker nodes.

5. The method of claim 1, further comprising:
selecting a number of worker nodes to perform respective machine learning tasks for the first machine learned sub-neural network based on a number of hidden layer connections of the first machine learned sub-neural network; and
assigning the respective machine learning task for learning the first machine learned sub-neural network to each worker node in the first plurality of worker nodes based on the selected number of worker nodes.

6. The method of claim 1, further comprising:
causing a composite neural network to be generated according to a composite neural network search algorithm based on the first machine learned sub-neural network and the second machine learned sub-neural network.

7. The method of claim 1, wherein the method is performed by a task scheduler of a worker group of a distributed learning system according to a parameter server framework, the worker group comprising the first plurality of worker nodes and the second plurality of worker nodes.

8. One or more non-transitory computer-readable media storing one or more programs and configured for execution by a computing system having one or more processors, the one or more programs comprising instructions which, when executed by the one or more processors, cause the computing system to perform operations comprising:
assigning a respective machine learning task for learning a first machine learned sub-model to each worker node in a first plurality of worker nodes and assigning a respective machine learning task for learning a second machine learned sub-model to each worker node in a second plurality of worker nodes such that each worker node in the first plurality of worker nodes and in the second plurality of worker nodes performs the respective machine learning task at least partially in parallel with at least one other of the respective machine learning tasks assigned to first plurality and second plurality of worker nodes;
based on detecting that the first plurality of worker nodes has completed the respective machine learning tasks assigned to the first plurality of worker nodes, commanding the first plurality of worker nodes to perform a synchronization process for the first machine learned sub-model; and
based on detecting that the second plurality of worker nodes has completed the respective machine learning tasks assigned to the second plurality of worker nodes, commanding the second plurality of worker nodes to perform a synchronization process for the second machine learned sub-model.

9. The one or more non-transitory computer-readable media of claim 8, wherein the instructions, when executed by the one or more processors, further cause the computing system to perform operations comprising:
based on the detecting that the first plurality of worker nodes have completed the synchronization process for the first machine learned sub-model, assigning a respective machine learning task for learning a third machine learned sub-model to each worker node in the first plurality of worker nodes such that each worker node in the first plurality of worker nodes performs the respective machine learning task for the third machine learned sub-model at least partially in parallel with at least one of the respective machine learning tasks for the second machine learned sub-model assigned to the second plurality of worker nodes.

10. The one or more non-transitory computer-readable media of claim 9, wherein the instructions, when executed by the one or more processors, further cause the computing system to perform operations comprising:
discarding the third machine learned sub-model at an iteration of a composite model search algorithm.

11. The one or more non-transitory computer-readable media of claim 8, wherein the instructions, when executed by the one or more processors, further cause the computing system to perform operations comprising:

selecting a number of worker nodes to perform respective machine learning tasks for the first machine learned sub-model based on a width of the first machine learned sub-model; and assigning the respective machine learning task for learning the first machine learned sub-model to each worker node in the first plurality of worker nodes based on the selected number of worker nodes.

12. The one or more non-transitory computer-readable media of claim 8, wherein the instructions, when executed by the one or more processors, further cause the computing system to perform operations comprising:

selecting a number of worker nodes to perform respective machine learning tasks for the first machine learned sub-model based on a depth of the first machine learned sub-model; and assigning the respective machine learning task for learning the first machine learned sub-model to each worker node in the first plurality of worker nodes based on the selected number of worker nodes.

13. The one or more non-transitory computer-readable media of claim 8, wherein the instructions, when executed by the one or more processors, further cause the computing system to perform operations comprising:

causing a composite model to be generated according to a composite model search algorithm based on the first machine learned sub-model and the second machine learned sub-model.

14. The one or more non-transitory computer-readable media of claim 8, wherein the first machine learned sub-model is a first machine learned neural network; and wherein the second machine learned sub-model is a second machine learned neural network.

15. A computing system comprising:
storage media;
one or more processors; and
one or more programs stored in the storage media and configured for execution by the one or more processors, the one or more programs comprising instructions which, when executed by the one or more processors, cause the computing system to perform operations comprising:

assigning a respective machine learning task for learning a first machine learned sub-model to each worker node in a first plurality of worker nodes and assigning a respective machine learning task for learning a second machine learned sub-model to each worker node in a second plurality of worker nodes such that each worker node in the first plurality of worker nodes and in the second plurality of worker nodes performs the respective machine learning task at least partially in parallel with at least one other of the respective machine learning tasks assigned to first plurality and second plurality of worker nodes;

based on detecting that the first plurality of worker nodes has completed the respective machine learning tasks assigned to the first plurality of worker nodes, commanding the first plurality of worker nodes to perform a synchronization process for the first machine learned sub-model; and based on detecting that the second plurality of worker nodes has completed the respective machine learning tasks assigned to the second plurality of worker nodes, commanding the second plurality of worker nodes to perform a synchronization process for the second machine learned sub-model.

16. The computing system of claim 15, wherein the instructions, when executed by the one or more processors, further cause the computing system to perform operations comprising:

based on the detecting that the first plurality of worker nodes have completed the synchronization process for the first machine learned sub-model, assigning a respective machine learning task for learning a third machine learned sub-model to each worker node in the first plurality of worker nodes such that each worker node in the first plurality of worker nodes performs the respective machine learning task for the third machine learned sub-model at least partially in parallel with at least one of the respective machine learning tasks for the second machine learned sub-model assigned to the second plurality of worker nodes.

17. The computing system of claim 16, wherein the instructions, when executed by the one or more processors, further cause the computing system to perform operations comprising:

discarding the third machine learned sub-model at an iteration of a composite model search algorithm.

18. The computing system of claim 15, wherein the instructions, when executed by the one or more processors, further cause the computing system to perform operations comprising:

selecting a number of worker nodes to perform respective machine learning tasks for the first machine learned sub-model based on a width of the first machine learned sub-model; and assigning the respective machine learning task for learning the first machine learned sub-model to each worker node in the first plurality of worker nodes based on the selected number of worker nodes.

19. The computing system of claim 15, wherein the instructions, when executed by the one or more processors, further cause the computing system to perform operations comprising:

selecting a number of worker nodes to perform respective machine learning tasks for the first machine learned sub-model based on a depth of the first machine learned sub-model; and assigning the respective machine learning task for learning the first machine learned sub-model to each worker node in the first plurality of worker nodes based on the selected number of worker nodes.

20. The computing system of claim 15, wherein the instructions, when executed by the one or more processors, further cause the computing system to perform operations comprising:

causing a composite model to be generated according to a composite model search algorithm based on the first machine learned sub-model and the second machine learned sub-model.

* * * * *